(12) United States Patent
Chen et al.

(10) Patent No.: US 12,401,795 B2
(45) Date of Patent: *Aug. 26, 2025

(54) VIDEO DATA INTER PREDICTION BASED ON CONTROL POINTS

(71) Applicant: HUAWEI TECHNOLOGIES CO., LTD., Guangdong (CN)

(72) Inventors: Huanbang Chen, Shenzhen (CN); Shan Gao, Dongguan (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,871

(22) Filed: Jun. 6, 2022

(65) Prior Publication Data
US 2022/0394270 A1 Dec. 8, 2022

Related U.S. Application Data

(63) Continuation of application No. 16/898,973, filed on Jun. 11, 2020, now Pat. No. 11,363,274, which is a
(Continued)

(30) Foreign Application Priority Data
Dec. 12, 2017 (CN) .......................... 201711319298.2

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 10,462,488 B1 * 10/2019 Li .......................... H04N 19/44
10,602,180 B2    3/2020 Chen et al.
(Continued)

FOREIGN PATENT DOCUMENTS

AU     2017340631 A1    3/2019
CN        1325220 A    12/2001
(Continued)

OTHER PUBLICATIONS

Chen et al., "Description of SDR, HDR and 360° video coding technology proposal by Huawei, GoPro, HiSilicon, and Samsung," buJoint Video Exploration Team (JVET) of ITU-T SG 16 WP 3 and ISO/IEC JTC 1/SC 29/WG 11, JVET-J0025, 10th Meeting: San Diego, US, Apr. 10-20, 2018, 8 pages.
(Continued)

*Primary Examiner* — Chikaodili E Anyikire
(74) *Attorney, Agent, or Firm* — Fish & Richardson P.C.

(57) ABSTRACT

A video data inter prediction method is provided, which includes: determining a candidate motion information list of a current picture block, where the candidate motion information list includes at least one first candidate motion information group, at least one second candidate motion information group, the first candidate motion information group is a motion information group determined based on motion information of preset locations on a first neighboring picture block of the current picture block and a motion model of the first neighboring picture block, the second candidate motion information group is a set of motion information of at least two sample locations that are respectively neighboring to at least two preset locations on the current picture block; determining target motion information
(Continued)

from the candidate motion information list; and performing inter prediction on the current picture block based on the target motion information.

18 Claims, 10 Drawing Sheets

Related U.S. Application Data continuation of application No. PCT/CN2018/120435, filed on Dec. 12, 2018.

(51) Int. Cl.
*H04N 19/132* (2014.01)
*H04N 19/159* (2014.01)
*H04N 19/176* (2014.01)

(56) References Cited

U.S. PATENT DOCUMENTS

| | | | |
|---|---|---|---|
| 10,701,390 B2* | 6/2020 | Li | H04N 19/176 |
| 10,728,571 B2 | 7/2020 | Son et al. | |
| 10,798,394 B2 | 10/2020 | Zhou | |
| 2017/0332095 A1* | 11/2017 | Zou | H04N 19/537 |
| 2018/0098063 A1* | 4/2018 | Chen | H04N 19/52 |
| 2019/0028731 A1* | 1/2019 | Chuang | H04N 19/176 |
| 2019/0208211 A1* | 7/2019 | Zhang | H04N 19/517 |
| 2019/0222834 A1 | 7/2019 | Chen et al. | |
| 2019/0222865 A1 | 7/2019 | Zhang et al. | |
| 2019/0364295 A1* | 11/2019 | Li | H04N 19/105 |
| 2020/0021836 A1 | 1/2020 | Xu et al. | |
| 2020/0059651 A1* | 2/2020 | Lin | H04N 19/52 |
| 2020/0288163 A1 | 9/2020 | Poirier et al. | |
| 2020/0288166 A1 | 9/2020 | Robert et al. | |
| 2021/0051339 A1 | 2/2021 | Liu et al. | |
| 2022/0394270 A1* | 12/2022 | Chen | H04N 19/176 |

FOREIGN PATENT DOCUMENTS

| | | |
|---|---|---|
| CN | 103716631 A | 4/2014 |
| CN | 104539966 A | 4/2015 |
| CN | 104935938 A | 9/2015 |
| CN | 107046645 A | 8/2017 |
| CN | 107071462 A | 8/2017 |
| JP | 2012165279 A | 8/2012 |
| KR | 100331048 B1 | 4/2002 |
| TW | I486061 B | 5/2015 |
| WO | 2017022973 A1 | 2/2017 |
| WO | 2017026681 A1 | 2/2017 |
| WO | 2017118409 A1 | 7/2017 |
| WO | 2017118411 A1 | 7/2017 |
| WO | 2017147765 A1 | 9/2017 |
| WO | 2017148345 A1 | 9/2017 |

OTHER PUBLICATIONS

Office Action in Japanese Appln. No. 2022-151544, mailed on Dec. 5, 2023, 6 pages (with English translation).

Jianle Chen et al. Algorithm Description of Joint Exploration Test Model 7 (JEM 7), Joint Video Exploration Team (JVET) of ITU-T SG 16 WP 3 and ISO/IEC JTC 1/SC 29/WG 11, JVET-G1001-v1, 7th Meeting: Torino, IT, Jul. 13-21, 2017, total 48 pages. XP030150980.

Cordula Heithausen et al,"Inter Prediction using Estimation and Explicit Coding of Affine Parameters",Joint Video Exploration Team (JVET) of ITU-T SG 16 WP 3 and ISO/IEC JTC 1/SC 29/WG 11, 8th Meeting: Macao, CN, Oct. 18-24, 2017, Document: JVET-H0031, total 11 pages.

Marta Karczewicz et al,"JVET AHG report: Tool evaluation (AHG1)", Joint Video Exploration Team (JVET) of ITU-T SG 16 WP 3 and ISO/IEC JTC 1/SC 29/WG 11, 7th Meeting: Torino, IT, Jul. 13-21, 2017, Document: JVET-G0001, total 7 pages.

Kwak, "A Prediction Search Algorithm in Video Coding by using Neighboring-Block Motion Vectors," Journal of the Korea Academia-Industrial cooperation Society, 2011, vol. 12, No. 8, pp. 3697-3705 (with English abstract).

Office Action in Australian Appln. No. 2023200956, mailed on Apr. 19, 2024, 3 pages.

Akula et al., Joint Video Exploration Team (JVET), "Description of SDR, HDR and 360° video coding technology proposal considering mobile application scenario by Samsung, Huawei, GoPro, and HiSilicon," Samsung Electronics, Huawei, GoPro, and HiSilicon, Apr. 10-20, 2018, XP030248219, 120 pages.

* cited by examiner

400

```
┌─────────────────────────────────────────────────────────────┐
│ Determine a candidate motion information list of a current  │
│ picture block, where the candidate motion information list  │
│ includes at least one first candidate motion information    │
│ group, at least one second candidate motion information     │
│ group, and a plurality of pieces of index information used  │
│ to index the first candidate motion information group and   │
│ the second candidate motion information group, the          │
│ plurality of pieces of index one-to-one correspond to the   │
│ plurality of candidate motion information groups, the first │── S410
│ candidate motion information groups is a motion information │
│ group determined based on motion information of a preset    │
│ location on a first neighboring picture block of the current│
│ picture block and a motion model of the first neighboring   │
│ picture block, the second candidate motion information      │
│ group is a set of motion information of at least two sample │
│ locations that are respectively neighboring to at least two │
│ preset locations on the current picture block, and the at   │
│ least two sample locations are located on at least one      │
│ second neighboring picture block of the current picture block│
└─────────────────────────────────────────────────────────────┘
                              │
                              ▼
┌─────────────────────────────────────────────────────────────┐
│ Determine target motion information from the candidate      │── S420
│                    motion information list                  │
└─────────────────────────────────────────────────────────────┘
                              │
                              ▼
┌─────────────────────────────────────────────────────────────┐
│ Perform inter prediction on the current picture block based │── S430
│           on the target motion information group            │
└─────────────────────────────────────────────────────────────┘
```

FIG. 4

VIDEO DATA INTER PREDICTION BASED ON CONTROL POINTS

CROSS-REFERENCE TO RELATED APPLICATIONS

This application is a continuation of U.S. patent application Ser. No. 16/898,973, filed on Jun. 11, 2020, which is a continuation of International Application No. PCT/CN2018/120435, filed on Dec. 12, 2018. The International Application claims priority to Chinese Patent Application No. 201711319298.2, filed on Dec. 12, 2017. All of the aforementioned patent applications are hereby incorporated by reference in their entireties.

TECHNICAL FIELD

This application relates to the video encoding and decoding field, and in particular, to a video data inter prediction method and apparatus, a video encoder, and a video decoder.

BACKGROUND

With development of an optoelectronic collection technology and an increasing requirement for high-definition digital videos, a video data amount becomes increasingly large. Limited heterogeneous transmission bandwidth and diversified video applications constantly impose a higher requirement on video coding efficiency. In this case, the high efficiency video coding (high efficient video coding, HEVC) standard starts to be formulated as required.

A basic principle of video coding and compression is to use a correlation between a space domain, a time domain, and a code word to eliminate redundancy to an utmost extent. Currently, a prevalent method is to use a block-based hybrid video coding framework to implement video coding and compression by performing steps such as prediction (including intra prediction and inter prediction), transform, quantization, and entropy coding. This coding framework is powerful, and the block-based hybrid video coding framework is also used for HEVC. In various video encoding/decoding schemes, motion estimation/motion compensation is a key technology that affects encoding/decoding efficiency.

There is a correlation between scenes in neighboring frames in a video. In this way, a picture may be divided into several blocks or macroblocks, locations of each block or macroblock in the neighboring frames are found, and a relative spatial location offset between the block or macroblock and a corresponding block or macroblock in the neighboring frame is obtained. The obtained relative offset is a motion vector (motion vector, MV). The process of obtaining the motion vector is referred to as motion estimation (motion estimation, ME). The motion estimation can eliminate inter-frame redundancy, thereby reducing bit overheads of video transmission.

In an existing motion estimation method, a coding block is selected from neighboring coding blocks of a current coding block according to a preset policy, and a motion information group of the current coding block is derived by using a motion information group of the coding block. In this method, an encoder side does not need to send, to a decoder side, index information indicating the neighboring coding blocks. This reduces the bit overheads of the video transmission. However, if the motion information group of the neighboring coding block is unavailable, the encoder side needs to reselect a motion estimation method, and sends indication information to the decoder side to indicate the reselected motion estimation method. Consequently, the bit overheads of the video transmission are increased.

SUMMARY

This application provides a video data inter prediction method and apparatus, a video encoder, and a video decoder, to reduce bit overheads of video transmission, and improve encoding/decoding efficiency.

According to a first aspect, a video data inter prediction method is provided. The method includes: determining a candidate motion information list of a current picture block, where the candidate motion information list includes at least one first candidate motion information group, at least one second candidate motion information group, and a plurality of pieces of index information used to index the first candidate motion information group and the second candidate motion information group, the plurality of pieces of index information one-to-one correspond to the plurality of candidate motion information groups, the first candidate motion information group is a motion information group determined based on motion information of preset locations on first neighboring picture block of the current picture block and a motion model of the first neighboring picture block, the second candidate motion information group is a set of motion information of at least two sample locations that are respectively neighboring to at least two preset locations on the current picture block, and the at least two sample locations are located on at least one second neighboring picture block of the current picture block; determining target motion information from the candidate motion information list, where the target motion information is a motion information group that is in the at least one first candidate motion information group and the at least one second candidate motion information group and that meets a screening rule; and performing inter prediction on the current picture block based on the target motion information.

It should be understood that the first neighboring picture block and the second neighboring picture block herein are merely used to distinguish between traversed spatially neighboring blocks of the current picture block and/or traversed temporally neighboring blocks of the current picture block in a process of obtaining the candidate motion information group in different manners. The first neighboring picture block may include a spatially neighboring block of the current picture block and/or a temporally neighboring block of the current picture block. The second neighboring picture block may include a spatially neighboring block of the current picture block and/or a temporally neighboring block of the current picture block.

It should be noted that the preset location on the first neighboring picture block may be understood as a corner location of the first neighboring picture block, for example, the top-left corner and the top-right corner of the first neighboring picture block, or the top-left corner and the bottom-left corner of the first neighboring picture block, or the top-left corner, the bottom-left corner, and the top-right corner of the first neighboring picture block. The at least two preset locations on the current picture block may be understood as at least two corner locations of the current picture block, and may also be referred to as at least two control points of the current picture block, for example, the top-left corner and the top-right corner of the current picture block, or the top-left corner and the bottom-left corner of the current picture block, or the top-left corner, the bottom-left corner, and the top-right corner of the current picture block.

In an example, that the target motion information is a motion information group that meets a screening rule may be understood as determining a first candidate motion information group or a second candidate motion information group from the candidate motion information list, where a rate-distortion cost is lowest when the target motion information is used to encode the current coding block.

According to the inter prediction method provided in this embodiment, an encoder side or a decoder side constructs the candidate motion information list including two types of candidate motion information groups. The two types of candidate motion information groups have index information that is uniformly orchestrated. If one of the two types of candidate motion information groups is not applicable to the current picture block, the encoder side may select the target motion information from the other type of candidate motion information group included in the candidate motion information list, and send index information of the target motion information to the decoder side by using a bitstream. Because the candidate motion information group in the candidate motion information list has unique index information, the encoder side does not need to transfer, in the bitstream, indication information indicating a motion estimation method used by the encoder side. This reduces bit overheads of video transmission.

Optionally, a length of bin string of index information of the first candidate motion information group is less than or equal to a length of bin string of index information of the second candidate motion information group.

The first candidate motion information group is a motion model-based motion information group, and efficiency of performing encoding/decoding based on the first candidate motion information group is higher than efficiency of performing encoding/decoding based on the second candidate motion information group. Therefore, there is a relatively high probability that the first candidate motion information group is the target motion information. In this way, the index information of the first candidate motion information group may be set to index information with a relatively small quantity of bits. This helps reduce bit overheads of video transmission.

Optionally, a quantity of bits of first index information in the plurality of pieces of index information is less than a quantity of bits of second index information in the plurality of pieces of index information, the first index information corresponds to a motion information group that is first added into the candidate motion information list, and the second index information corresponds to a motion information group that is later added into the candidate motion information list; and the determining a candidate motion information list of a current picture block includes: first adding the first candidate motion information group into the candidate motion information list, and then adding the second candidate motion information group into the candidate motion information list.

The first candidate motion information group is a motion model-based motion information group, and efficiency of performing encoding/decoding based on the first candidate motion information group is higher than efficiency of performing encoding/decoding based on the second candidate motion information group. Therefore, there is a relatively high probability that the first candidate motion information group is the target motion information. In this way, the index information of the first candidate motion information group may be set to index information with a relatively small quantity of bits. This helps reduce bit overheads of video transmission.

Optionally, the determining a candidate motion information list of a current picture block includes: when the first neighboring picture block is a neighboring picture block using a translational motion model, adding motion information of the first neighboring picture block into the candidate motion information list as a first candidate motion information group; and/or when the first neighboring picture block is a picture block using a non-translational motion model, deriving, based on motion information of at least two preset locations on the first neighboring picture block and the motion model of the first neighboring picture block, motion information of at least two preset locations corresponding to the current picture block, and adding the motion information of the at least two preset locations corresponding to the current picture block into the candidate motion information list as a first candidate motion information group.

It should be understood that the non-translational motion model may include but is not limited to various affine motion models, for example, a 4-parameter affine motion model, a 6-parameter affine motion model, or an 8-parameter affine motion model.

If the motion model of the first neighboring picture block is the translational motion model, the motion information group of the first neighboring picture block may be directly added into the candidate motion information list as the first candidate motion information group. This improves picture compression efficiency. If the motion model of the first neighboring picture block is the non-translational motion model, the first candidate motion information group needs to be generated according to a formula corresponding to the non-translational motion model and based on the motion information of the preset locations on the first neighboring picture block.

Optionally, first neighboring picture blocks include a first neighboring picture block using a translational motion model and a first neighboring picture block using a non-translational motion model, a quantity of bits of first index information in the plurality of pieces of index information is less than a quantity of bits of second index information in the plurality of pieces of index information, the first index information corresponds to a motion information group that is first added into the candidate motion information list, and the second index information corresponds to a motion information group that is later added into the candidate motion information list.

The determining a candidate motion information list of a current picture block includes:
  when a quantity of first neighboring picture blocks using the non-translational motion model is greater than or equal to a quantity threshold, deriving, based on motion information of at least two preset locations on the first neighboring picture block using the non-translational motion model and the motion model of the first neighboring picture block using the non-translational motion model, motion information of at least two preset locations corresponding to the current picture block, adding the motion information of the at least two preset locations corresponding to the current picture block into the candidate motion information list as a first candidate motion information group, and then adding the second candidate motion information group into the candidate motion information list.

If the quantity of first neighboring picture blocks using the non-translational motion model is greater than or equal to the quantity threshold, it indicates that there is a relatively high probability that the current picture block is a picture block using the non-translational motion model. Therefore, the first candidate motion information group derived based on the first neighboring picture block using the non-translational motion model may be first added into the candidate motion information list, and then the second candidate motion information group is added into the candidate motion information list. A length of bin string of index information of a motion information group that is first added into the candidate motion information list is relatively small, and there is a relatively high probability that the target motion information is the motion information group that is first added into the candidate motion information list. Therefore, this embodiment helps reduce bit overheads of video transmission.

Optionally, the determining a candidate motion information list of a current picture block further includes: when a length of the candidate motion information list is less than a length threshold, and first neighboring picture blocks further include a first neighboring picture block using a translational motion model, adding a motion information group of the first neighboring picture block using the translational motion model into the candidate motion information list as a first candidate motion information group; and if the length of the candidate motion information list is still less than the length threshold, adding zero motion information into the candidate motion information list.

It should be understood that the length of the candidate motion information list herein may be understood as a quantity of candidate motion information groups that have already been added into the candidate motion information list. The length threshold herein may be understood as a preset maximum quantity of candidate motion information groups in the candidate motion information list.

If the length of the candidate motion information list is less than the length threshold after the second candidate motion information group is added into the candidate motion information list, and the first neighboring picture blocks further include the first neighboring picture block using the translational motion model, the motion information group of the first neighboring picture block using the translational motion model is added into the candidate motion information list as the first candidate motion information group; and if the length of the candidate motion information list is still less than the length threshold, the zero motion information is added into the candidate motion information list.

Optionally, when a quantity of first neighboring picture blocks using a non-translational motion model is greater than or equal to a quantity threshold, a length of bin string of index information of a third candidate motion information group is less than a length of bin string of index information of the second candidate motion information group, and the third candidate motion information group is a first candidate motion information group derived based on motion information of at least two preset locations on the first neighboring picture block using the non-translational motion model and the motion model of the first neighboring picture block using the non-translational motion model.

If the quantity of first neighboring picture blocks using the non-translational motion model is greater than or equal to the quantity threshold, it indicates that there is a relatively high probability that the current picture block is a picture block using the non-translational motion model. Therefore, the index information of the first candidate motion information group (namely, the third candidate motion information group) derived based on the first neighboring picture block using the non-translational motion model may be set to index information with a relatively small quantity of bits. There is a relatively high probability that the target motion information is the third candidate motion information group. Therefore, this embodiment helps reduce bit overheads of video transmission.

Optionally, when a length of the candidate motion information list is less than a length threshold, and first neighboring picture blocks further include a first neighboring picture block using a translational motion model, the candidate motion information list further includes motion information of the first neighboring picture block using the translational motion model, the motion information of the first neighboring picture block using the translational motion model is a first candidate motion information group, and a length of bin string of index information of the motion information of the first neighboring picture block using the translational motion model is greater than or equal to a length of bin string of index information of the second candidate motion information group.

If the length of the candidate motion information list is less than the length threshold after the second candidate motion information group is added into the candidate motion information list, and the first neighboring picture blocks further include the first neighboring picture block using the translational motion model, the motion information group of the first neighboring picture block using the translational motion model is added into the candidate motion information list as the first candidate motion information group, and the index information of the first candidate motion information group is set to index information with a relatively large quantity of bits; and if the length of the candidate motion information list is still less than the length threshold, zero motion information is added into the candidate motion information list.

Optionally, first neighboring picture blocks include a first neighboring picture block using a translational motion model and a first neighboring picture block using a non-translational motion model, a quantity of bits of first index information in the plurality of pieces of index information is less than a quantity of bits of second index information in the plurality of pieces of index information, the first index information corresponds to a motion information group that is first added into the candidate motion information list, and the second index information corresponds to a motion information group that is later added into the candidate motion information list.

The determining a candidate motion information list of a current picture block includes:
when a quantity of first neighboring picture blocks using the non-translational motion model is less than or equal to a quantity threshold, first adding a motion information group of the first neighboring picture block using the translational motion model into the candidate motion information list as a first candidate motion information group, and then adding the second candidate motion information group into the candidate motion information list.

If the quantity of first neighboring picture blocks using the non-translational motion model is less than or equal to the quantity threshold, it indicates that there is a relatively high probability that the current picture block is a picture block using the translational motion model. Therefore, the motion information group of the first neighboring picture block using the translational motion model may be first added into the candidate motion information list as the first candidate motion information group, and then the second candidate motion information group is added into the candidate motion information list. A length of bin string of index information of a motion information group that is first added into the candidate motion information list is relatively small, and there is a relatively high probability that the target motion information is the motion information group that is first added into the candidate motion information list. Therefore, this embodiment helps reduce a quantity of bits of video transmission.

Optionally, the determining a candidate motion information list of a current picture block further includes: when a length of the candidate motion information list is less than a length threshold, and first neighboring picture blocks further include a first neighboring picture block using a non-translational motion model, further deriving, based on motion information of at least two preset locations on the first neighboring picture block using the non-translational motion model and the motion model of the first neighboring picture block using the non-translational motion model, motion information of the at least two preset locations on the current picture block, and adding the motion information of the at least two preset locations on the current picture block into the candidate motion information list as a first candidate motion information group; and if the length of the candidate motion information list is still less than the length threshold, adding zero motion information into the candidate motion information list.

If the length of the candidate motion information list is less than the length threshold after the second candidate motion information group is added into the candidate motion information list, and the first neighboring picture blocks further include the first neighboring picture block using the non-translational motion model, the first candidate motion information group derived based on the motion information group of the first neighboring picture block using the non-translational motion model is added into the candidate motion information list; and if the length of the candidate motion information list is still less than the length threshold, the zero motion information is added into the candidate motion information list. In this way, a selection range of the target motion information can be expanded.

Optionally, when a quantity of first neighboring picture blocks using a non-translational motion model is less than or equal to a quantity threshold, motion information of a first neighboring picture block using a translational motion model is a first candidate motion information group, and a length of bin string of index information of the motion information group of the first neighboring picture block using the translational motion model is less than a length of bin string of index information of the second candidate motion information group.

If the quantity of first neighboring picture blocks using the non-translational motion model is less than or equal to the quantity threshold, it indicates that there is a relatively high probability that the current picture block is a picture block using the translational motion model. Therefore, the motion information group of the first neighboring picture block using the translational motion model may be used as the first candidate motion information group, and index information of the first candidate motion information group is set to index information with a relatively small quantity of bits. There is a relatively high probability that the target motion information is the first candidate motion information group. Therefore, this embodiment helps reduce bit overheads of video transmission.

Optionally, when a length of the candidate motion information list is less than a length threshold, and first neighboring picture blocks further include a first neighboring picture block using a non-translational motion model, the candidate motion information list further includes a fourth candidate motion information group, the fourth candidate motion information group is a first candidate motion information group derived based on motion information of at least two preset locations on the first neighboring picture block using the non-translational motion model and the motion model of the first neighboring picture block using the non-translational motion model, and a length of bin string of index information of the fourth candidate motion information group is greater than or equal to a length of bin string of index information of the second candidate motion information group.

If the length of the candidate motion information list is less than the length threshold after the second candidate motion information group is added into the candidate motion information list, and the first neighboring picture blocks further include the first neighboring picture block using the non-translational motion model, the motion information group derived based on the motion information group of the first neighboring picture block using the non-translational motion model is added into the candidate motion information list as the first candidate motion information group, and the index information of the first candidate motion information group is set to index information with a relatively large quantity of bits; and if the length of the candidate motion information list is still less than the length threshold, zero motion information is added into the candidate motion information list. In this way, a selection range of the target motion information can be expanded.

Optionally, both the first candidate motion information group and the second candidate motion information group are motion information of a first group of locations on the current picture block, and the at least two preset locations on the current picture block are a second group of locations; and the determining a candidate motion information list of a current picture block includes: when the second group of locations is different from the first group of locations, deriving the second candidate motion information group according to a location transformation formula and based on motion information corresponding to the second location.

When a quantity of locations corresponding to the first candidate motion information group is the same as a quantity of locations corresponding to the second candidate motion information group, all the motion information groups in the candidate motion information list obtained according to this embodiment are motion information of same locations. This reduces complexity of motion estimation.

Optionally, the first candidate motion information group is motion information of a first group of locations on the current picture block, and the second candidate motion information group is motion information of a third group of locations on the current picture block; and the method further includes: when the first group of locations is different from the third group of locations, deriving a fifth candidate motion information group according to a location transformation formula and based on the second candidate motion information group, where locations corresponding to the fifth candidate motion information group are the same as the first group of locations.

When a quantity of locations corresponding to the first candidate motion information group is the same as a quantity of locations corresponding to the second candidate motion information group, all the motion information groups in the candidate motion information list obtained according to this embodiment are motion information of same locations. This reduces complexity of motion estimation.

According to a second aspect, this application provides a video data inter prediction apparatus, including several functional units configured to implement any method in the first aspect. For example, the video data inter prediction apparatus may include:

a candidate motion information list determining unit, configured to determine a candidate motion information list of a current picture block, where the candidate motion information list includes at least one first candidate motion information group, at least one second candidate motion information group, and a plurality of pieces of index information used to index the first candidate motion information group and the second candidate motion information group, the first candidate motion information group is a motion information group determined based on motion information of preset locations on a first neighboring picture block of the current picture block and a motion model of the first neighboring picture block, the second candidate motion information group is a set of motion information of at least two sample locations that are respectively neighboring to at least two preset locations on the current picture block, and the at least two sample locations are located on at least one second neighboring picture block of the current picture block; and an inter prediction processing unit, configured to determine target motion information from the candidate motion information list, where the target motion information is a motion information group that is in the at least one first candidate motion information group and the at least one second candidate motion information group and that meets a screening rule, and the inter prediction processing unit is further configured to perform inter prediction on the current picture block based on the target motion information.

The inter prediction apparatus may be, for example, applied to a video encoding apparatus (a video encoder) or a video decoding apparatus (a video decoder).

According to a third aspect, this application provides a video encoder. The video encoder is configured to encode a picture block, and the video encoder includes:

the inter prediction apparatus according to the second aspect, where the inter prediction apparatus is configured to predict a prediction block of a coding picture block based on target motion information, and the target motion information is a motion information group that is in a candidate motion information list and that meets a screening rule, for example, a rate-distortion cost is lowest when the target motion information is used to encode the current picture block;

an entropy encoder, configured to encode index information of the target motion information into a bitstream, where the index information of the target motion information is used to determine the target motion information from the candidate motion information list; and a reconstructor, configured to reconstruct the coding picture block based on the prediction block.

According to a fourth aspect, this application provides a video decoder. The video decoder is configured to decode a bitstream to obtain a picture block, and the video decoder includes:

an entropy decoder, configured to decode the bitstream to obtain index information of target motion information;

the inter prediction apparatus according to the second aspect, where the inter prediction apparatus is configured to predict a prediction block of a coding picture block based on the target motion information, and the target motion information is a motion information group indicated by the index information in a candidate motion information list; and a reconstructor, configured to reconstruct the coding picture block based on the prediction block.

According to a fifth aspect, this application provides a video data encoding device. The device includes:

a memory, configured to store video data, where the video data includes one or more picture blocks; and a video encoder, configured to: determine a candidate motion information list of a current picture block, where the candidate motion information list includes at least one first candidate motion information group, at least one second candidate motion information group, and a plurality of pieces of index information used to index the first candidate motion information group and the second candidate motion information group, the first candidate motion information group is a motion information group determined based on motion information of preset locations on a first neighboring picture block of the current picture block and a motion model of the first neighboring picture block, the second candidate motion information group is a set of motion information of at least two sample locations that are respectively neighboring to at least two preset locations on the current picture block, and the at least two sample locations are located on at least one second neighboring picture block of the current picture block; determine target motion information from the candidate motion information list, where the target motion information is a motion information group that is in the at least one first candidate motion information group and the at least one second candidate motion information group and that meets a screening rule; perform inter prediction on the current picture block based on the target motion information; and send a bitstream including index information of the target motion information.

According to a sixth aspect, this application provides a video data decoding device. The device includes:

a memory, configured to store bitstream-form video data; and a video decoder, configured to: decode a bitstream to obtain index information, where the index information is used to determine target motion information; determine a candidate motion information list of a current picture block, where the candidate motion information list includes at least one first candidate motion information group, at least one second candidate motion information group, and a plurality of pieces of index information used to index the first candidate motion information group and the second candidate motion information group, the first candidate motion information group is a motion information group determined based on motion information of preset locations on a first neighboring picture block of the current picture block and a motion model of the first neighboring picture block, the second candidate motion information group is a set of motion information of at least two sample locations that are respectively neighboring to at least two preset locations on the current picture block, and the at least two sample locations are located on at least one second neighboring picture block of the current picture block; determine the target motion information from the candidate motion information list based on the index information that is obtained by decoding the bitstream; and perform inter prediction on the current picture block based on the target motion information.

According to a seventh aspect, this application provides an encoding device, including a non-volatile memory and a processor that are coupled to each other. The processor invokes program code stored in the memory, to perform some or all steps in any method in the first aspect.

According to an eighth aspect, this application provides a decoding device, including a non-volatile memory and a processor that are coupled to each other. The processor invokes program code stored in the memory, to perform some or all steps in any method in the first aspect.

According to a ninth aspect, this application provides a computer-readable storage medium. The computer-readable storage medium stores program code, and the program code includes instructions used to perform some or all steps in any method in the first aspect.

According to a tenth aspect, an embodiment of this application provides a computer program product. When the computer program product runs on a computer, the computer is enabled to perform some or all steps in any method in the first aspect.

It should be understood that, the technical solutions in the second to the tenth aspects of this application are consistent with the technical solution of the first aspect. Beneficial effects achieved by the aspects and corresponding feasible implementations are similar, and details are not described again.

BRIEF DESCRIPTION OF DRAWINGS

FIG. 4 is a schematic flowchart of an inter prediction method according to this application;

DESCRIPTION OF EMBODIMENTS

For ease of understanding this application, possible technical features in the technical solutions provided in this application are first described.

Figure 1:
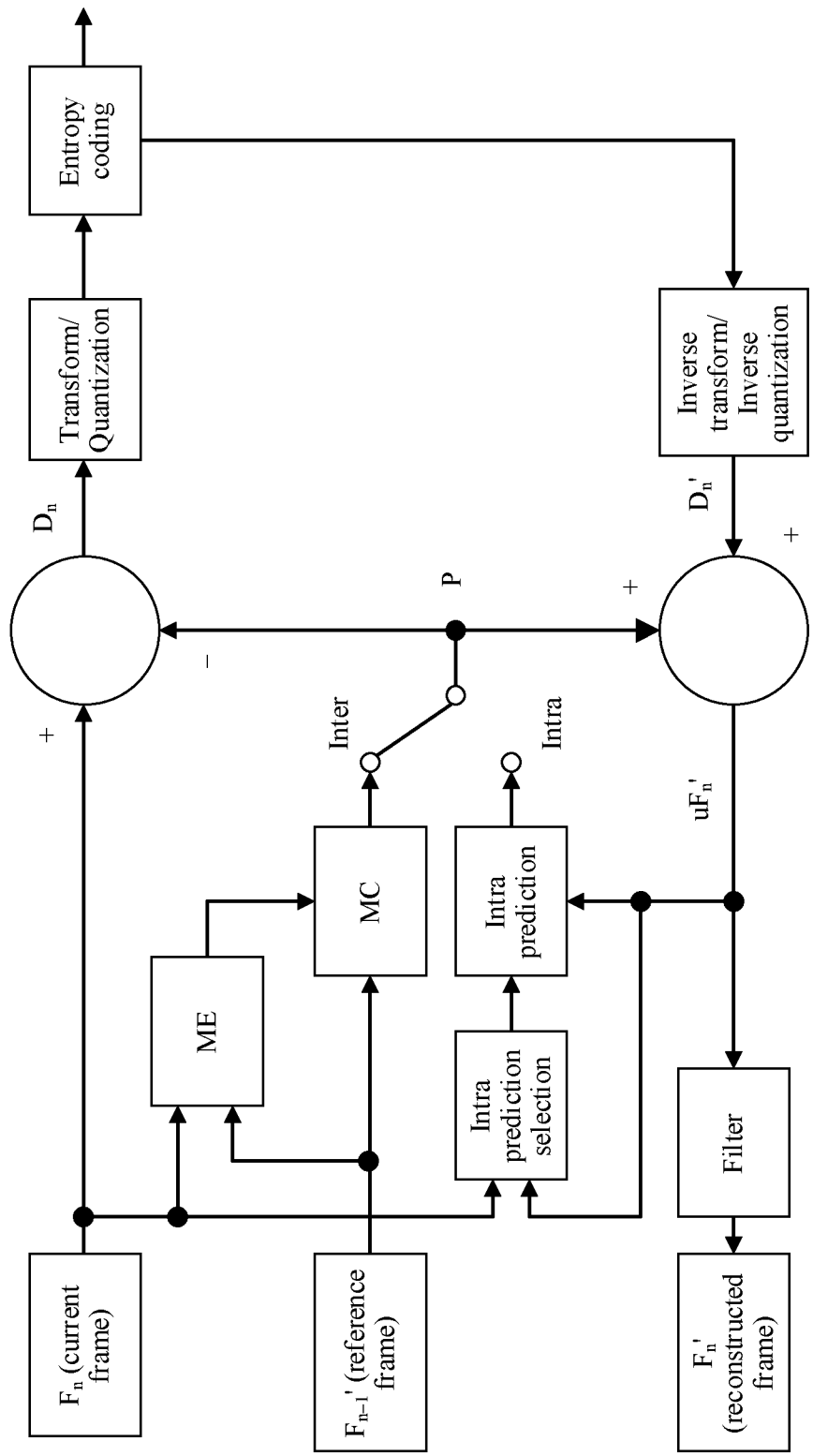
FIG. 1 is a schematic flowchart of a video encoding method applicable to this application.

FIG. 1 is a schematic flowchart of a video encoding method applicable to this application.

The video encoding method includes phases such as intra prediction (intra prediction), inter prediction (inter prediction), transform (transform), quantization (quantization), entropy coding (entropy coding), and in-loop filtering (in-loop filtering). After a picture is partitioned into coding blocks, intra prediction or inter prediction is performed, transform and quantization are performed after a residual is obtained, and finally, entropy coding is performed and a bitstream is output. Herein, the coding block is an array that is in a size of M×N (M may be equal to N or may not be equal to N) and that includes samples. In addition, a sample value of each sample location is known. In FIG. 1, P represents a prediction value, $D_n$ represents a residual, $uF_n'$ represents a reconstruction value (before filtering), and $D_n'$ represents a residual.

Intra prediction means predicting sample values of samples in a current coding block by using sample values of samples in a reconstructed area in a current picture.

Inter prediction means searching for a matching reference block in a reconstructed picture for a current coding block in a current picture, and using sample values of samples in the reference block as prediction information or prediction values (where the information and the value are not distinguished below) of sample values of samples in the current coding block. This process is motion estimation. In addition, a motion information group of the current coding block is transmitted.

It should be noted that the motion information group of the current coding block includes prediction direction indication information (which is usually forward prediction, backward prediction, or bidirectional prediction), one or two motion vectors pointing to a reference block, and indication information (which is usually denoted as a reference index) of a picture in which the reference block is located.

Forward prediction means selecting at least one reference picture from a forward reference picture set, to obtain at least one reference block for a current coding block. Backward prediction means selecting at least one reference picture from a backward reference picture set, to obtain at least one reference block for a current coding block. Bidirectional prediction means selecting at least one reference picture from each of a forward reference picture set and a backward reference picture set, to separately obtain at least one reference block. When a bidirectional prediction method is used, the current coding block has at least two reference blocks. Each reference block needs to be indicated by using a motion vector and a reference index. Then, prediction values of sample values of samples in the current block is determined based on sample values of samples in the two reference blocks.

In a motion estimation process, a reference picture needs to be searched for a plurality of reference blocks for the current coding block, and a specific reference block or specific reference blocks finally used for prediction is/are determined through rate-distortion optimization (rate-distortion optimization, RDO) or by using another method.

After the prediction information is obtained by using an intra prediction method or an inter prediction method, residual information may be obtained based on the sample values of the samples in the current coding block and the corresponding prediction information. For example, the residual information may be obtained by directly subtracting the sample values of the samples of the current coding block from the sample values of the samples of the reference block. Alternatively, the residual information may be obtained in another possible manner. Then, the residual information is transformed by using a method such as discrete cosine transformation (discrete cosine transformation, DCT), and then operations such as quantization and entropy coding are performed on the transformed residual information, to finally obtain a bitstream, so that a decoder side decodes the bitstream. In processing at an encoder side, a filtering operation may be further performed on a prediction signal and a reconstructed residual signal, to obtain a reconstructed signal, and the reconstructed signal is used as a reference signal for subsequent encoding.

Figure 2:
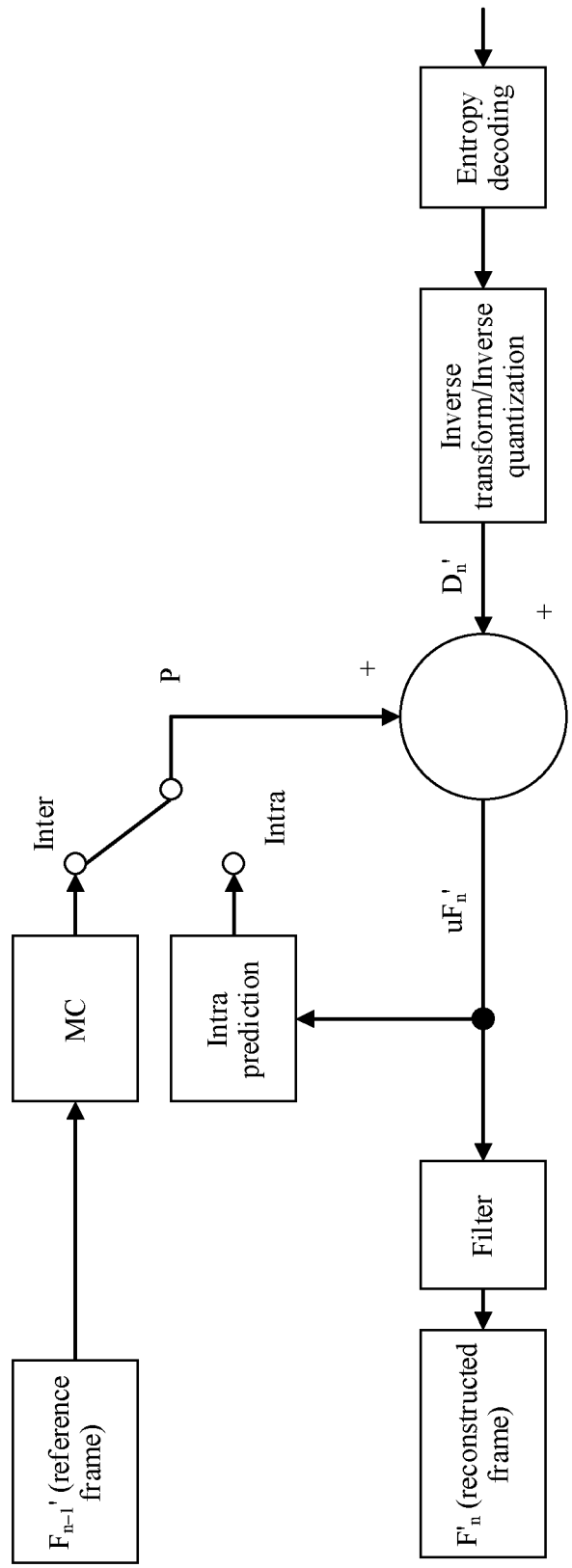
FIG. 2 is a schematic flowchart of a video decoding method applicable to this application.

Processing performed by the decoder side on the bitstream is similar to an inverse process of encoding a picture by the encoder side. FIG. 2 is a schematic flowchart of a bitstream decoding method applicable to this application.

As shown in FIG. 2, operations such as entropy decoding and dequantization are first performed to obtain residual information through transform, and a decoder side parses a bitstream to obtain a prediction mode of a current coding block. If the prediction mode is intra prediction, prediction information is constructed by using sample values of samples in a reconstructed area around the current coding block. If the prediction mode is inter prediction, a motion information group of the current coding block needs to be obtained, a reference block is determined in a reconstructed picture by using the motion information group, and sample values of samples in the reference block is used as prediction information. Reconstructed information (which is also referred to as a reconstructed block) of the current coding block can be obtained by performing a filtering operation on the prediction information (which is also referred to as a prediction block) and the residual information (which is also referred to as a residual block), to obtain a reconstructed partial picture.

In some possible implementations, a motion information group of a current coding block may be obtained through non-translational motion model-based prediction.

In some implementations of non-translational motion model-based prediction, an encoder side and the decoder side use a same motion model to derive motion information of each motion compensation subunit in the current coding block, and perform motion compensation based on the motion information of the motion compensation subunit to obtain the prediction block. This improves prediction efficiency. Commonly used motion models include a 6-parameter affine model and a 4-parameter affine model.

The 4-parameter affine model is shown in formula (1):

$$\begin{cases} vx = a_1 + a_3 x + a_4 y \\ vy = a_2 - a_4 x + a_3 y \end{cases} \quad (1)$$

The 4-parameter affine model may be represented by motion vectors of two samples and coordinates of the two samples relative to a sample at the top-left corner of the current coding block. A sample used to represent a motion model parameter is referred to as a control point. If samples at the top-left corner (0, 0) and the top-right corner (W, 0) are used as control points, motion vectors ($vx_0$, $vy_0$) and ($vx_1$, $vy_1$) of the control points at the top-left corner and the top-right corner of the current coding block are first determined. Then, the motion information of each motion compensation subunit in the current coding block is derived according to formula (2). (x, y) represents coordinates of a motion compensation subunit relative to the sample at the top-left corner of the current coding block, and W represents the width of the current coding block.

$$\begin{cases} vx = \frac{vx_1 - vx_0}{W} x - \frac{vy_1 - vy_0}{W} y + vx_0 \\ vy = \frac{vy_1 - vy_0}{W} x + \frac{vx_1 - vx_0}{W} y + vy_0 \end{cases} \quad (2)$$

The 6-parameter affine model is shown in formula (3):

$$\begin{cases} vx = a_1 + a_3 x + a_4 y \\ vy = a_2 + a_5 x + a_6 y \end{cases} \quad (3)$$

The 6-parameter affine model may be represented by motion vectors of three control points (which are also referred to as preset locations) and coordinates of the three control points relative to the sample at the top-left corner of the current coding block. If samples at the top-left corner (0, 0), the top-right corner (W, 0), and the bottom-left corner (0, H) are used as the control points, motion vectors ($vx_0$, $vy_0$), ($vx_1$, $vy_1$), and ($vx_2$, $vy_2$) of the control points at the top-left corner, the top-right corner, and the bottom-left corner of the current coding block are first determined. Then, the motion information of each motion compensation subunit in the current coding block is derived according to formula (4). (x, y) represents coordinates of a motion compensation subunit relative to the sample at the top-left corner of the current coding block, and W and H represent the width and the height of the current coding block. It should be noted that, in this application, for definitions of the width and the height, refer to a related standard in standards of the picture processing field or the video processing field. For example, the width refers to a quantity of samples of the current coding block in a horizontal direction, the height refers to a quantity of samples of the current coding block in a vertical direction.

$$\begin{cases} vx = \frac{vx_1 - vx_0}{W} x + \frac{vx_2 - vy_0}{H} y + vx_0 \\ vy = \frac{vy_1 - vy_0}{W} x + \frac{vy_2 - vx_0}{H} y + vy_0 \end{cases} \quad (4)$$

An 8-parameter bilinear model is shown in formula (5):

$$\begin{cases} vx = a_1 + a_3 x + a_4 y + a_7 xy \\ vy = a_2 + a_5 x + a_6 y + a_8 xy \end{cases} \quad (5)$$

The 8-parameter bilinear model may be represented by motion vectors of four control points and coordinates of the four control points relative to the sample at the top-left corner of the current coding block. If samples at the top-left corner (0, 0), the top-right corner (W, 0), the bottom-left corner (0, H), and the bottom-right corner (W, H) are used as the control points, motion vectors ($vx_0$, $vy_0$), ($vx_1$, $vy_1$), ($vx_2$, $vy_2$), and ($vx_3$, $vy_3$) of the control points at the top-left corner, the top-right corner, the bottom-left corner, and the bottom-right corner of the current coding block are first determined. Then, the motion information of each motion compensation subunit in the current coding block is derived according to formula (6). (x, y) represents coordinates of a motion compensation subunit relative to the sample at the top-left corner of the current coding block, and W and H represent the width and the height of the current coding block.

$$\begin{cases} v_x = \dfrac{v_{1x} - v_{0x}}{W} x + \dfrac{v_{2x} - v_{0x}}{H} y + \dfrac{v_{3x} + v_{0x} - v_{1x} - v_{2x}}{WH} y + v_{0x} \\ v_y = \dfrac{v_{1y} - v_{0y}}{W} x + \dfrac{v_{2y} - v_{0y}}{H} y + \dfrac{v_{3y} + v_{0y} - v_{1y} - v_{2y}}{WH} y + v_{0y} \end{cases} \quad (6)$$

A coding block that is predicted by using a non-translational motion model is referred to as a non-translational coding block. An affine coding block is a non-translational coding block. Motion information of control points of the non-translational coding block may be obtained by using an affine model merge (affine model merge, AMM) mode. There are two affine model merge modes: a motion model-based AMM mode and a control point-based complex merge (complex merge) mode.

Figure 3:
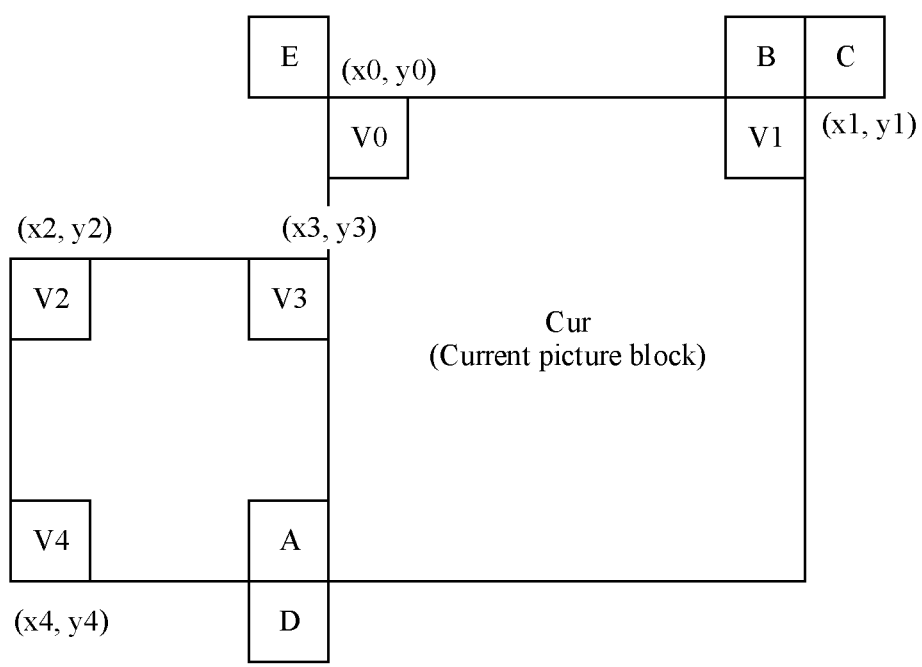
FIG. 3 is a schematic diagram of a method for performing prediction based on a motion model-based affine model merge mode according to this application.

FIG. 3 shows a method for performing prediction based on the motion model-based AMM mode according to this application.

When motion vectors of control points of a current coding block (which may also be referred to as a "current block") is encoded, a coding block is selected from neighboring coding blocks (which may also be referred to as "neighboring blocks", for example, "spatially neighboring blocks") according to a preset policy, motion information of corner locations (for example, the top-left corner and the top-right corner) of the current block is derived by using motion information of corner locations (for example, the top-left corner and the top-right corner) of the coding block, so that a motion model of the current block is the same as that of the coding block. It should be noted that, that the motion models are the same means that a parameter value and a quantity of parameters of the motion model of the current block are the same as those of the neighboring block in a same coordinate system. For example, the current block and the neighboring block each use the 4-parameter affine model, the current block and the neighboring block each use the 6-parameter affine model, or the current block and the neighboring block each use the 8-parameter bilinear model.

As shown in FIGS. 3, A, B, C, D, and E are sample locations (which may also be referred to as "locations" for short) on neighboring coding blocks (namely, spatially neighboring blocks) of the current block. Traversing is performed in a sequence of A-B-C-D-E to find an affine coding block and obtain motion information of preset locations (which may also be referred to as control points, for example, the top-left corner and the top-right corner of the affine coding block) of the affine coding block, so as to derive motion information of corresponding preset locations (which may also be referred to as control points, for example, the top-left corner and the top-right corner of the current block) on the current block. It should be noted that A, B, C, D, and E in the example herein each may also be understood as a sample, for example, may be a sample or a sample block including at least two samples. If the sample is a sample block, a size of the sample block is, for example, 2×2, 1×2, 4×2, 4×4, or another size.

The following uses A as an example to describe a derivation process. Other cases are deduced by analogy.

If a coding block on which the sample location A (for example, a left sample location A) is located is an affine coding block, a motion vector ($vx_2$, $vy_2$) of the top-left corner ($x_2$, $y_2$) and a motion vector ($vx_3$, $vy_3$) of the top-right corner ($x_3$, $y_3$) of the affine coding block are obtained. A motion vector ($vx_0$, $vy_0$) of the top-left corner ($x_0$, $y_0$) of the current coding block is calculated by using formula (7), and a motion vector ($vx_1$, $vy_1$) of the top-right corner ($x_1$, $y_1$) of the current coding block is calculated by using formula (8).

$$\begin{cases} vx_0 = vx_2 + \dfrac{(vx_3 - vx_2)}{x_3 - x_2} \times (x_0 - x_2) - \dfrac{(vy_3 - vy_2)}{(x_3 - x_2)} \times (y_0 - y_2) \\ vy_0 = vx_2 + \dfrac{(vy_3 - vy_2)}{x_3 - x_2} \times (x_0 - x_2) + \dfrac{(vx_3 - vx_2)}{x_3 - x_2} \times (y_0 - y_2) \end{cases} \quad (7)$$

$$\begin{cases} vx_1 = vx_2 + \dfrac{(vx_3 - vx_2)}{x_3 - x_2} \times (x_1 - x_2) - \dfrac{(vy_3 - vy_2)}{(x_3 - x_2)} \times (y_1 - y_2) \\ vy_1 = vx_2 + \dfrac{(vy_3 - vy_2)}{x_3 - x_2} \times (x_1 - x_2) + \dfrac{(vx_3 - vx_2)}{x_3 - x_2} \times (y_1 - y_2) \end{cases} \quad (8)$$

It should be noted that another method for obtaining the motion information of the control points may also be applied to this application. For brevity, details are not described herein.

It can be learned from the foregoing that because the current block inherits a motion model of the neighboring block, the motion model-based AMM mode has higher coding efficiency than the control point-based complex merge mode. However, if the motion information group of the neighboring block is unavailable, the encoder side needs to reselect a motion estimation method, and sends indication information to the decoder side to indicate the reselected motion estimation method. Consequently, bit overheads of video transmission are increased. In addition, even if the motion information group of the neighboring block is available, an optional motion information group can be added by using the control point-based complex merge mode.

This application provides a video data inter prediction method, to reduce bit overheads of video transmission, and expand an application scope of the motion model-based AMM mode.

As shown in FIG. 4, a method 400 in this embodiment of this application may include the following steps.

S410: Determine a candidate motion information list of a current picture block, where the candidate motion information list includes at least one first candidate motion information group, at least one second candidate motion information group, and a plurality of pieces of index information used to index the first candidate motion information group and the second candidate motion information group, the plurality of pieces of index information one-to-one correspond to the plurality of candidate motion information groups, the first candidate motion information group is a motion information group determined based on motion information of preset locations on a first neighboring picture block of the current picture block and a motion model of the first neighboring picture block, the second candidate motion information group is a set of motion information of at least two sample locations that are respectively neighboring to at least two preset locations on the current picture block, and the at least two sample locations are located on at least one second neighboring picture block of the current picture block.

S420: Determine target motion information from the candidate motion information list.

S430: Perform inter prediction on the current picture block based on the target motion information.

The method 400 may be performed by an encoder side or a decoder side. The encoder side or the decoder side may be a hardware device; or may be encoding software or decoding software running on a general-purpose hardware device; or may be a set of encoding software and a hardware device that has an encoding function, or a set of decoding software and a hardware device that has a decoding function. It should be understood that, if the method 400 is performed by the encoder side, the target motion information in S420 is a motion information group that is in the at least one first candidate motion information group and the at least one second candidate motion information group and that meets a screening rule. For example, the target motion information is a motion information group in the candidate motion information list, where a rate-distortion cost is lowest when the motion information group is used to encode the current picture block. If the method 400 is performed by the decoder side, the target motion information in S420 is a motion information group that is in the candidate motion information list and that is indicated by decoded index information.

When the method 400 is performed by the encoder side, the picture block should be understood as a coding block. For example, the current picture block is a current coding block, the first neighboring picture block is a first neighboring coding block, and the second neighboring picture block is a second neighboring coding block. When the method 400 is performed by the decoder side, the picture block should be understood as a decoding block. For example, the current picture block is a current decoding block, the first neighboring picture block is a first neighboring decoding block, and the second neighboring picture block is a second neighboring decoding block. For brevity, the inter prediction method provided in this application is mainly described below by using an example in which the encoder side performs the method 400. The inter prediction method performed by the decoder side is described only when a processing manner of the decoder side is different from that of the encoder side. Unless otherwise specified, an operation performed by the decoder side is similar to an operation performed by the encoder side.

A manner in which the encoder side determines the candidate motion information list is not limited in this application. For example, the first candidate motion information group may be obtained by using the method shown in FIG. 3, or the first candidate motion information group may be obtained by using another method, and the second candidate motion information group may be obtained by using the following method. After the first candidate motion information group and the second candidate motion information group are obtained, the first candidate motion information group and the second candidate motion information group are filled into the candidate motion information list.

The first neighboring coding block may be the same as or different from the second neighboring coding block. As shown in FIG. 3, the first neighboring coding block may be a coding block on which the location A is located, and the second neighboring coding block may be a coding block (which is not shown in FIG. 3) on which the location D is located. In this case, the first neighboring coding block is different from the second neighboring coding block. The second neighboring coding block may alternatively be the coding block on which the location A is located. In this case, the first neighboring coding block is the same as the second neighboring coding block.

The first neighboring coding block and the second neighboring coding block may be spatially neighboring coding blocks of the current block, or may be temporally neighboring coding blocks of the current block. This is not limited in this application. For example, the spatially neighboring coding blocks include but are not limited to coding blocks on which the sample locations A, B, C, D, and E shown in FIG. 3 are located.

The first neighboring coding block may be a coding block using a translational motion model, or may be a coding block using a non-translational motion model. Therefore, when the first neighboring coding block is the coding block using the translational motion model, the first candidate motion information group is a translational motion information group; or when the first neighboring coding block is the coding block using the non-translational motion model, the first candidate motion information group is a non-translational motion information group. The translational motion information group includes one motion vector or two motion vectors, and the non-translational motion information group includes at least two motion vectors. Therefore, a first candidate motion information group may include only one motion vector, or may include a plurality of motion vectors.

Correspondingly, when the first neighboring coding block is the coding block using the translational motion model, the preset location on the first neighboring coding block is, for example, the location A shown in FIG. 3. When the first neighboring coding block is the coding block using the non-translational motion model, the preset location on the first neighboring coding block may be, for example, the top-left corner $(x_2, y_2)$ and the top-right corner $(x_3, y_3)$ in FIG. 3.

For the second candidate motion information group, the at least two preset locations on the current coding block may be, for example, $CP_1$ and $CP_2$ in FIG. 5 below, and the at least two sample locations neighboring to the at least two preset locations on the current coding block may be, for example, B2 and B1. B2 and B1 may belong to a same neighboring coding block (namely, the second neighboring coding block), or may belong to different neighboring coding blocks.

In this application, the motion information group includes but is not limited to a motion vector. For example, a motion information group includes prediction direction indication information (which is usually forward prediction, backward prediction, or bidirectional prediction), one or two or more than two motion vectors, and a reference index (reference index). It should be understood that, if a motion information group is a translational motion information group, the motion information group may include one or two motion vectors, for example, include a motion vector in a forward prediction direction and/or a motion vector in a backward prediction direction. In other words, a motion information group may include one motion vector or may include two motion vectors in different prediction directions. If a motion information group is a non-translational motion information group, the motion information group includes a combination of a plurality of motion vectors, for example, a combination of two motion vectors, which may be specifically a combination of motion vectors of two preset locations (which are also referred to as control points). It should be understood that the decoder side may calculate a motion vector of a sample with any location coordinates (x, y) in the current picture block by using location coordinates of the two control points and the combination of the motion vectors of the two control points. This may also be referred to as calculating a motion vector of each motion compensation subunit in the current picture block. The motion vector points to a reference block in a corresponding reference frame.

After determining the candidate motion information list, the encoder side obtains target motion information from the candidate motion information list through screening according to the screening rule. The target motion information may also be referred to as an optimal motion information group. For example, the encoder side may perform motion compensation prediction by using each motion information group in the candidate motion information list, and then, obtains the optimal motion information group through screening according to a rate-distortion optimization (rate distortion optimization, RDO) criterion. For example, the rate-distortion cost is lowest when the optimal motion information group is used to encode the current coding block. Then, an index of the optimal motion information group is written into a bitstream, and then the bitstream is sent. The foregoing RDO criterion is the screening rule.

The foregoing example is merely an example for description, and another manner of determining the optimal motion information group is also applicable to this application. According to the encoding method provided in this embodiment, the encoder side constructs the candidate motion information list including two types of candidate motion information groups. It should be understood that the two types of candidate motion information groups herein are merely intended to reflect different obtaining (derivation) manners of the candidate motion information groups. If one of the two types of candidate motion information groups is not applicable to the current coding block, the encoder side may select the target motion information from the other type of candidate motion information group included in the candidate motion information list, and send index information of the target motion information to the decoder side by using a bitstream. Because the candidate motion information group in the candidate motion information list has unique index information, the encoder side does not need to transfer, in the bitstream, indication information indicating a candidate motion information list construction method used by the encoder side. This reduces bit overheads of video transmission. In addition, if a neighboring block of the current block is a coding block that uses a control point-based complex merge mode, motion estimation that is based on a motion model-based AMM mode may still be performed on the current block by using a motion information group of the neighboring block. This improves coding efficiency.

An embodiment of the inter prediction method provided in this application is further described below.

Embodiment 1

Step 1: Construct a candidate motion information list.

Step 1.1: Add motion model-based motion information into the candidate motion information list.

Neighboring blocks around a current block may be traversed according to the method shown in FIG. 3, to find all non-translational coding blocks. If motion models of the non-translational coding blocks are the same as a motion model of the current block, motion information of control points of each non-translational coding block is obtained, and then, motion information (namely, a first motion information group) of corresponding control points of the current block is derived.

Step 1.2: Add combined control point-based motion information into the candidate motion information list.

If the length of the candidate motion information list obtained in step 1.1 is less than a preset list length N, the combined control point-based motion information (namely, a second motion information group) is constructed, and the motion information is added into the candidate motion information list.

A method for constructing the combined control point-based motion information is as follows.

First, motion information of each control point is derived. As shown in FIG. 5, $CP_k$ (k=1, 2, 3, 4) represents a $k^{th}$ control point. $A_0$, $A_1$, $A_2$, $B_0$, $B_1$, $B_2$, and $B_3$ are spatially neighboring locations of the current block, and are used to predict motion information of $CP_k$ (k=1, 2, 3). $T_r$ represents a temporally neighboring location of the current block, and is used to predict motion information of $CP_4$. It should be understood that $T_r$ represents a bottom-right spatially neighboring sample location of a same-location block of the current block, where the same-location block is a picture block that has a same size, a same shape, and same coordinates as the current block and that is in a reference picture.

Location coordinates of $CP_1$, $CP_2$, $CP_3$, and $CP_4$ are respectively (0, 0), (W, 0), (0, H) and (W, H), where W and H represent the width and the height of the current block.

Motion information of each control point is obtained in the following sequence.

For $CP_1$, a check sequence is $B_2$-$A_2$-$B_3$. If motion information of $B_2$ is available (available), the motion information of $B_2$ is used. Otherwise, $A_2$ and $B_3$ are detected in sequence. If motion information of all the three locations is unavailable, motion information of $CP_1$ cannot be obtained.

For $CP_2$, a check sequence is $B_0$-$B_1$.

For $CP_3$, a check sequence is $A_0$-$A_1$.

For $CP_4$, motion information of $T_r$ may be used.

Herein, that the motion information is available means that a block on which a location X is located has already been encoded in an inter prediction mode. Otherwise, the location X is unavailable. The location X is, for example, the location $B_2$, the location $A_2$, the location $B_3$, the location $A_0$, the location $A_1$, the location $B_0$, the location $B_1$, or the location $T_r$.

It should be noted that another method for obtaining the motion information of the control points may also be applicable to the present invention. Details are not described herein. For example, for $CP_1$, if $B_2$, $A_2$, and $B_3$ are all available, $CP_1$ may use motion information of any one of $\{B_2, A_2, \text{and } B_3\}$. This method is also applied to $CP_2$ to $CP_4$, and details are not described herein again. Alternatively, as shown in FIG. 5, a source of the motion information of the control point $CP_1$ (which may also be referred to as a top-left sample) of the current picture block may include motion information of x1 samples. The x1 samples include at least one of: a sample Col-LT that is in a video frame temporally neighboring to a video frame to which the current picture block belongs and that is at a same location as the top-left sample LT of the current picture block, the spatially neighboring picture block $A_2$ on the left of the current picture block, the spatially neighboring picture block $B_2$ on the top left of the current picture block, and the spatially neighboring picture block $B_3$ on the top of the current picture block.

Then, the motion information of the control points is combined, to obtain non-translational motion information.

Motion information of two control points is combined to construct a 4-parameter affine model. A combination manner of the two control points includes the following manners: $\{CP_1, CP_4\}$, $\{CP_2, CP_3\}$, $\{CP_1, CP_2\}$, $\{CP_2, CP_4\}$, $\{CP_1, CP_3\}$, and $\{CP_3, CP_4\}$. For example, a 4-parameter affine model constructed by using the control points $CP_1$ and $CP_2$ is denoted as Affine ($CP_1$, $CP_2$).

Motion information of three control points is combined to construct a 6-parameter affine model. A combination manner of the three control points includes: $\{CP_1, CP_2, CP_4\}$, $\{CP_1, CP_2, CP_3\}$, $\{CP_2, CP_3, CP_4\}$, and $\{CP_1, CP_3, CP_4\}$ For example, a 6-parameter affine model constructed by using the control points $CP_1$, $CP_2$, and $CP_3$ is denoted as Affine ($CP_1$, $CP_2$, $CP_3$).

Motion information of four control points is combined to construct an 8-parameter bilinear model. An 8-parameter bilinear model constructed by using the control points $CP_1$, $CP_2$, $CP_3$, and $CP_4$ is denoted as Bilinear ($CP_1$, $CP_2$, $CP_3$, $CP_4$).

These models are traversed in a preset sequence. If motion information of a control point corresponding to a combination model is unavailable, it is considered that the model is unavailable. If motion information of all control points corresponding to a combination model is available, a reference index of the model is determined, and motion vectors of the control points are scaled. If motion information of all the control points after scaling is consistent, the model is invalid. Otherwise, the motion information of the control points is added into the candidate motion information list.

$$MV_s = \frac{CurPoc - DesPoc}{CurPoc - SrcPoc} \times MV \quad (9)$$

A scaling method is shown in formula (9). CurPoc represents a picture order count (picture order count, POC) number of a current frame, DesPoc represents a POC number of a reference frame of the current block, SrcPoc represents a POC number of a reference frame of a control point, and $MV_s$ represents an MV obtained through scaling.

Step 1.3: Supplement motion information.

Optionally, if the length of the candidate motion information list obtained in step 1.2 is less than the specified list length N, motion information of a coded block neighboring to the current block is added into the candidate motion information list, or zero motion information (namely, a zero motion vector) is filled into the candidate motion information list.

Figure 6:
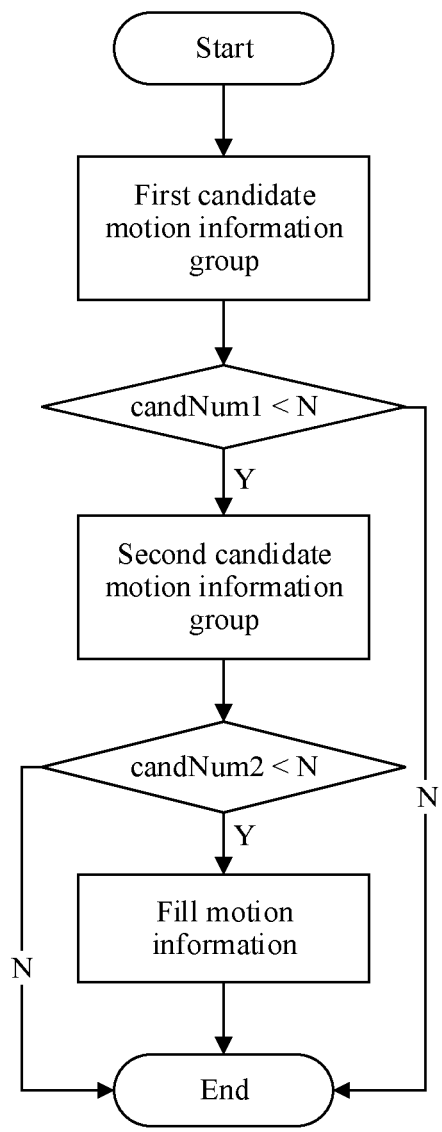
FIG. 6 is a schematic diagram of a method for constructing a candidate motion information list according to this application.

A flowchart of constructing the candidate motion information list is shown in FIG. 6.

S601: Obtain a first candidate motion information group, and add the first candidate motion information group into the candidate motion information list; and if a length (candNum1) of the candidate motion information list in this case is less than the preset list length N, perform step S602; or if a length of the candidate motion information list is equal to N, end the procedure of constructing the candidate motion information list.

S602: Obtain a second candidate motion information group, and add the second candidate motion information group into the candidate motion information list; and if a length (candNum2) of the candidate motion information list in this case is less than the preset list length N, perform step S603; or if a length of the candidate motion information list is equal to N, end the procedure of constructing the candidate motion information list.

S603: Fill motion information, where the motion information may be translational motion information of a neighboring block of a current block and/or zero motion information, stop filling until a length value of the candidate motion information list is equal to N, and end the procedure of constructing the candidate motion information list.

Table 1 shows an example of the candidate motion information list constructed in Embodiment 1.

TABLE 1

| Index value | Motion model | Motion vector combination |
| --- | --- | --- |
| 0 | 4-parameter | MV0 and MV1 |
| 1 | 6-parameter | MV0, MV1, and MV2 |
| 2 | 4-parameter | MV0' and MV1' |
| 3 | 8-parameter | MV0, MV1, MV2, and MV3 |
| 4 | Translational motion | MV0 |

In Table 1, MV0, MV1, MV2, and MV3 are motion vectors of four control points of the current block, the motion vector combination corresponding to the index value 0 is the motion information determined in step 1.1, and the motion vector combination corresponding to the index value 2 is the motion information determined in step 1.2.

It should be noted that the candidate motion information list may further include information such as a prediction direction and a reference index value. If a reference value corresponds to bidirectional prediction, the candidate item includes a forward reference index and a forward motion vector combination, and a backward reference index and a backward motion vector combination. If a reference value corresponds to forward prediction, the candidate item includes a forward reference index and a forward motion vector combination; and if a reference value corresponds to backward prediction, the candidate item includes a backward reference index and a backward motion vector combination. Further, if the encoder side and the decoder side agree that a combination of a specific quantity of motion vectors is a combination of motion vectors of control points at specific locations, for example, a combination of two motion vectors is, by default, a combination of motion vectors of two control points at the top-left corner and the top-right corner, the candidate motion information list does not need to reflect a location coordinate combination corresponding to each motion vector combination; otherwise, in the candidate motion information list, a candidate item (candidate) corresponding to a non-translational motion model corresponding to each index includes motion vectors of a plurality of control points and corresponding location coordinates of the plurality of control points.

Step 2: Determine an optimal motion information group.

The decoder side decodes a bitstream to obtain a block-level index, for example, an index value of an optimal candidate motion information group of the current block in the candidate motion information list, so as to obtain a motion vector predictor of a control point of the current block.

The motion vector predictor may be directly used as a motion vector of the control point of the current block. The method is a method for obtaining the motion vector based on a merge (merge) mode.

Alternatively, the decoder side further decodes the bitstream to obtain a motion vector difference of each control point, and adds the motion vector predictor and the motion vector difference to obtain a motion vector of the control point of the current block. The method is a method for obtaining the motion vector based on an advanced motion vector prediction (advanced motion vector prediction, AMVP) mode.

The encoder side performs motion compensation prediction by using each motion information group in the candidate motion information list, then selects the optimal motion information group and an index value of the optimal motion information group according to an RDO criterion, and then writes the index value into the bitstream.

The motion vector predictor may be directly used as the motion vector of the control point of the current block (a combination prediction mode (Merge)).

Alternatively, the encoder side further performs motion estimation, obtains a final motion vector through searching, and writes the motion vector difference (motion vector difference, MVD) of each control point into the bitstream (the AMVP mode). The MVD herein may be understood as a difference between an estimated motion vector and an optimal motion vector selected from the list.

Step 3: Determine a motion vector $(V_x, V_y)$ of each sample (x, y) or each motion compensation subunit in the current block based on motion information and a motion model of the control point, and in a reference frame indicated by a reference index in a prediction direction of the current block, obtain a prediction value of each sample based on a location to which the motion vector of each sample in the current block.

It should be understood that, in an implementation, if the motion vector combination is not limited to a combination of motion vectors of specified locations, in the candidate motion information list, each motion vector combination has location coordinates associated with the motion vector combination. In other words, each motion vector in each motion vector combination one-to-one corresponds to location coordinates of a control point corresponding to the motion vector.

In another implementation, the candidate motion information list does not need to include location coordinates corresponding to each motion vector combination if the motion vector combination is a combination of motion vectors of specified locations, for example, a motion vector combination corresponding to a 4-parameter affine motion model is a combination of motion vectors of the top-left corner and the top-right corner of the current block, and a motion vector combination corresponding to a 6-parameter affine motion model is a combination of motion vectors of the top-left corner, the bottom-left corner, and the top-right corner of the current block.

It should be understood that the 4-parameter affine motion model corresponds to a combination of two motion vectors, the 6-parameter affine motion model corresponds to a combination of three motion vectors, and an 8-parameter affine motion model corresponds to a combination of four motion vectors. In this way, in the candidate motion information list, an affine motion model that needs to be used may be indirectly derived by using a quantity of motion vectors included in a motion vector combination. Therefore, the candidate motion information list may not include a motion model information field.

It should be understood that in step 3 herein, it is assumed that a motion model corresponding to the optimal motion information group selected in step 2 is the non-translational motion model. If the optimal motion information group selected in step 2 is one motion vector or two motion vectors that correspond to bidirectional prediction, in other words, if the motion model corresponding to the optimal motion information group selected in step 2 is a translational motion model, the motion vector in the optimal motion information group is used as the motion vector of the current block, or a sum of the motion vector in the optimal motion information group and the MVD is used as the motion vector of the current block. In the reference frame indicated by the reference index in the prediction direction of the current block, a prediction block of the current block is obtained based on a location to which the motion vector of the current block.

Optionally, in the method 400, a length of bin string of index information of the first candidate motion information group is less than or equal to a length of bin string of index information of the second candidate motion information group.

The first candidate motion information group is a motion model-based motion information group, and efficiency of performing encoding based on the first candidate motion information group is higher than efficiency of performing encoding based on the second candidate motion information group. Therefore, there is a relatively high probability that the first candidate motion information group is the target motion information. In this way, the index information of the first candidate motion information group may be set to index information with a relatively small quantity of bits. This helps reduce bit overheads of video transmission.

For example, it may be set that a motion information group that is first added into the candidate motion information list corresponds to index information with a relatively small quantity of bits, and a motion information group that is later added into the candidate motion information list corresponds to index information with a relatively large quantity of bits. When the candidate motion information list is constructed, the first candidate motion information group is first added into the candidate motion information list, and then the second candidate motion information group is added into the candidate motion information list, so that the quantity of bits of the index information of the first candidate motion information group is less than the quantity of bits of the index information of the second candidate motion information group.

Optionally, the determining a candidate motion information list of a current coding block includes the following steps.

S411: When the first neighboring coding block is a neighboring coding block using a translational motion model, add motion information of the first neighboring coding block into the candidate motion information list as a first candidate motion information group; and/or S412: when the first neighboring coding block is a coding block using a non-translational motion model, derive, based on motion information of at least two preset locations on the first neighboring coding block and the motion model of the first neighboring coding block, motion information of at least two preset locations corresponding to the current coding block, and add the motion information of the at least two preset locations corresponding to the current coding block into the candidate motion information list as a first candidate motion information group.

If the motion model of the first neighboring coding block is the translational motion model, the motion information group of the first neighboring coding block does not need to be processed, and may be directly added into the candidate motion information list as the first candidate motion information group. This improves coding efficiency. If the motion model of the first neighboring coding block is the non-translational motion model, the first candidate motion information group needs to be generated according to a formula corresponding to the non-translational motion model and based on the motion information of the preset locations on the first neighboring coding block.

An embodiment of inter prediction provided in this application is further described below.

Embodiment 2

Step 1: Construct a candidate motion information list.

Step 1.1: Add motion model-based motion information into the candidate motion information list.

Neighboring blocks around a current block may be traversed according to the method shown in FIG. 3. If a neighboring block is a translational coding block, motion information of the neighboring block is directly filled into the candidate motion information list. If a neighboring block is a non-translational coding block, and a motion model of the non-translational coding block is the same as a motion model of the current block, motion information of control points of each non-translational coding block is obtained, and then, motion information (namely, a first motion information group) of corresponding control points of the current block is derived.

Step 1.2: Add combined control point—based motion information into the candidate motion information list.

For step 1.2 in Embodiment 2, refer to step 1.2 in Embodiment 1. For brevity, details are not described herein again.

Step 1.3: Supplement motion information.

Optionally, if the length of the candidate motion information list obtained in step 1.2 is less than the specified list length N, zero motion information (namely, a zero motion vector) is filled.

Table 2 shows an example of the candidate motion information list constructed in Embodiment 2.

TABLE 2

| Index value | Motion model | Motion vector combination |
|---|---|---|
| 0 | 4-parameter | MV0 and MV1 |
| 1 | 6-parameter | MV0, MV1, and MV2 |
| 2 | Translational motion | MV0 |
| 3 | 4-parameter | MV0' and MV1' |
| 4 | 8-parameter | MV0, MV1, MV2, and MV3 |

In Table 2, MV0, MV1, MV2, and MV3 are motion vectors of four control points of the current block, the motion vector combination corresponding to the index value 0 is the motion information determined in step 1.1, and the motion vector combination corresponding to the index value 3 is the motion information determined in step 1.2.

It should be noted that the candidate motion information list may further include information such as a prediction direction and a reference index value. If a reference value corresponds to bidirectional prediction, the candidate item includes a forward reference index and a forward motion vector combination, and a backward reference index and a backward motion vector combination. If a reference value corresponds to forward prediction, the candidate item includes a forward reference index and a forward motion vector combination; and if a reference value corresponds to backward prediction, the candidate item includes a backward reference index and a backward motion vector combination.

Step 2: Determine an optimal motion information.

The decoder side decodes a bitstream to obtain an index value of the optimal candidate motion information group of the current block in the list, so as to obtain a motion vector predictor of a control point of the current block.

The motion vector predictor may be directly used as a motion vector of the control point of the current block (a merge mode).

Alternatively, the decoder side decodes the bitstream to obtain a motion vector difference of each control point, and adds the motion vector predictor and the MVD to obtain a motion vector of the control point of the current block (an AMVP mode).

The encoder side performs motion compensation prediction by using each motion information group in the candidate motion information list, then selects the optimal motion information group and an index value of the optimal motion information group according to an RDO criterion, and then writes the index value into the bitstream.

The motion vector predictor may be directly used as the motion vector of the control point of the current block (the merge mode).

Alternatively, the encoder side further performs motion estimation, obtains a final motion vector through searching, and writes the MVD of each control point into the bitstream (the AMVP mode).

Step 3: Determine a motion vector $(V_x, V_y)$ of each sample (x, y) or each motion compensation subunit in the current block based on motion information and a motion model of the control point, and in a reference frame indicated by a reference index in a prediction direction of the current block, obtain a prediction value of each sample based on a location to which the motion vector of each sample in the current block.

It should be understood that, in an implementation, if the motion vector combination is not limited to a combination of motion vectors of specified locations, in the candidate motion information list, each motion vector combination has location coordinates associated with the motion vector combination. In other words, each motion vector in each motion vector combination one-to-one corresponds to location coordinates of a control point corresponding to the motion vector.

In another implementation, the candidate motion information list does not need to include location coordinates corresponding to each motion vector combination if the motion vector combination is a combination of motion vectors of specified locations, for example, a motion vector combination corresponding to a 4-parameter affine motion model is a combination of motion vectors of the top-left corner and the top-right corner of the current block, and a motion vector combination corresponding to a 6-parameter affine motion model is a combination of motion vectors of the top-left corner, the bottom-left corner, and the top-right corner of the current block.

It should be understood that the 4-parameter affine motion model corresponds to a combination of two motion vectors, the 6-parameter affine motion model corresponds to a combination of three motion vectors, and an 8-parameter affine motion model corresponds to a combination of four motion vectors. In this way, in the candidate motion information list, an affine motion model that needs to be used may be indirectly derived by using a quantity of motion vectors included in a motion vector combination. Therefore, the candidate motion information list may not include a motion model information field. It should be noted that the motion information list includes information about the prediction direction, and different motion models may be distinguished based on the information. For example, a bidirectional 4-parameter model includes two forward motion vectors and two backward motion vectors. A bidirectional translational model includes one forward motion vector and one backward motion vector.

Optionally, when a quantity of first neighboring coding blocks using a non-translational motion model is greater than or equal to a quantity threshold, a length of bin string of index information of a third candidate motion information group is less than a length of bin string of index information of the second candidate motion information group, and the third candidate motion information group is a first candidate motion information group derived based on motion information of at least two preset locations on the first neighboring coding block using the non-translational motion model and the motion model of the first neighboring coding block using the non-translational motion model.

FIG. 3 is used as an example. The coding block on which the location A is located is a first neighboring coding block using a non-translational motion model, the top-left corner $(x_2, y_2)$ and the top-right corner $(x_3, y_3)$ are at least two preset locations on the first neighboring coding block, V2 and V3 are motion information of the at least two preset locations, and V0 and V1 are a first candidate motion information group (namely, the third candidate motion information group) derived based on V2 and V3.

If the quantity of first neighboring coding blocks using the non-translational motion model is greater than or equal to the quantity threshold, it indicates that there is a relatively high probability that the current coding block is a coding block using the non-translational motion model. Therefore, index information of the first candidate motion information group (namely, the third candidate motion information group) derived based on the first neighboring coding block using the non-translational motion model may be set to index information with a relatively small quantity of bits. There is a relatively high probability that the target motion information is the third candidate motion information group. Therefore, this embodiment helps reduce a quantity of bits of video transmission.

For example, it may be set that a motion information group that is first added into the candidate motion information list corresponds to index information with a relatively small quantity of bits, and a motion information group that is later added into the candidate motion information list corresponds to index information with a relatively large quantity of bits. When the candidate motion information list is constructed, the third candidate motion information group is first added into the candidate motion information list, and then the second candidate motion information group is added into the candidate motion information list, so that the quantity of bits of the index information of the third candidate motion information group is less than the quantity of bits of the index information of the second candidate motion information group.

Optionally, when the length of the candidate motion information list is less than a length threshold, and first neighboring coding blocks further include a first neighboring coding block using a translational motion model, the candidate motion information list further includes motion information of the first neighboring coding block using the translational motion model, the motion information of the first neighboring coding block using the translational motion model is a first candidate motion information group, and a length of bin string of index information of the motion information of the first neighboring coding block using the translational motion model is greater than or equal to the quantity of bits of the index information of the second candidate motion information group.

In this application, the length of the candidate motion information list is a quantity of motion information groups that can be accommodated in the candidate motion information list.

If the length of the candidate motion information list is less than the length threshold after the second candidate motion information group is added into the candidate motion information list, and the first neighboring coding blocks further include the first neighboring coding block using the translational motion model, the motion information group of the first neighboring coding block using the translational motion model is added into the candidate motion information list as the first candidate motion information group, and the index information of the first candidate motion information group is set to index information with a relatively large quantity of bits; and if the length of the candidate motion information list is still less than the length threshold, zero motion information is added into the candidate motion information list.

Optionally, when a quantity of first neighboring coding blocks using a non-translational motion model is less than or equal to a quantity threshold, a motion information group of a first neighboring coding block using a translational motion model is a first candidate motion information group, and a length of bin string of index information of the motion information group of the first neighboring coding block using the translational motion model is less than a length of bin string of index information of the second candidate motion information group.

If the quantity of first neighboring coding blocks using the non-translational motion model is less than or equal to the quantity threshold, it indicates that there is a relatively high probability that the current coding block is a coding block using the translational motion model. Therefore, the motion information group of the first neighboring coding block using the translational motion model may be used as a first candidate motion information group, and index information of the first candidate motion information group is set to index information with a relatively small quantity of bits. There is relatively high probability that the target motion information is the first candidate motion information group. Therefore, this embodiment helps reduce bit overheads of video transmission.

FIG. 3 is used as an example. If the coding block on which the location A is located is a first neighboring coding block using a translational motion model, a motion information group of the coding block on which the location A is located may be used as motion information (namely, the first candidate motion information group) of a control point at the bottom-left corner of the current block.

It may be set that a motion information group that is first added into the candidate motion information list corresponds to index information with a relatively small quantity of bits, and a motion information group that is later added into the candidate motion information list corresponds to index information with a relatively large quantity of bits. When the candidate motion information list is constructed, the motion information group of the first neighboring coding block using the translational motion model is first added into the candidate motion information list as a first candidate motion information group, and then the second candidate motion information group is added into the candidate motion information list. This helps reduce a length of bin string of index information of the target motion information.

Optionally, when the length of the candidate motion information list is less than a length threshold, and first neighboring coding blocks further include a first neighboring coding block using a non-translational motion model, the candidate motion information list further includes a fourth candidate motion information group, the fourth candidate motion information group is a first candidate motion information group derived based on motion information of at least two preset locations on the first neighboring coding block using the non-translational motion model and the motion model of the first neighboring coding block using the non-translational motion model, and a length of bin string of index information of the fourth candidate motion information group is greater than or equal to the quantity of bits of the index information of the second candidate motion information group.

If the length of the candidate motion information list is less than the length threshold after the second candidate motion information group is added into the candidate motion information list, and the first neighboring coding blocks further include the first neighboring coding block using the non-translational motion model, a motion information group derived based on the motion information group of the first neighboring coding block using the non-translational motion model is added into the candidate motion information list as the first candidate motion information group, and the index information of the first candidate motion information group is set to index information with a relatively large quantity of bits; and if the length of the candidate motion information list is still less than the length threshold, zero motion information is added into the candidate motion information list.

FIG. 3 is used as an example. Assuming that the coding block on which the location A is located is a first neighboring coding block using a non-translational motion model, the top-left corner $(x_2, y_2)$ and the top-right corner $(x_3, y_3)$ are at least two preset locations on the first neighboring coding block, and V2 and V3 are motion information of the at least two preset locations, V0 and V1 are a first candidate motion information group (namely, the fourth candidate motion information group) derived based on V2 and V3.

An embodiment of the inter prediction method provided in this application is further described below.

Embodiment 3

Step 1: Construct a candidate motion information list.

As shown in FIG. 3, neighboring blocks around a current block are traversed in a sequence of A-B-C-D-E, and a quantity M of non-translational coding blocks in the neighboring blocks is counted.

If M is greater than a preset quantity threshold T, a sequence of adding motion information groups is:
first, motion information groups (namely, some first candidate motion information groups) that are of the current block and that are determined based on motion information groups of the non-translational coding blocks are added into the candidate motion information list, to be specific, motion information of at least two preset locations corresponding to the current block is derived based on motion information of at least two preset locations on the non-translational coding block and a motion model of the non-translational coding block, and the motion information of the at least two preset locations corresponding to the current block is added into the candidate motion information list as a first candidate motion information group;
then, a combined control point-based motion information group (namely, a second candidate motion information group) is added into the candidate motion information list;
if a length of the candidate motion information list in this case is less than the specified list length N, motion information groups (namely, some other first candidate motion information groups) that are of the current block and that are determined based on motion information groups of translational coding blocks are further added into the candidate motion information list; and
if a length of the candidate motion information list in this case is still less than the specified list length N, zero motion information is filled.

If M is less than or equal to a preset quantity threshold T, a sequence of adding motion information groups is:
first, motion information groups (namely, some first candidate motion information groups) that are of the current block and that are determined based on motion information groups of translational coding blocks are added into the candidate motion information list;
then, a combined control point-based motion information group (namely, a second candidate motion information group) is added into the candidate motion information list;
if a length of the candidate motion information list in this case is less than the specified list length N, motion information groups (namely, some other first candidate motion information groups) that are of the current block and that are derived based on motion information groups of the non-translational coding blocks are further added into the candidate motion information list; and
if a length of the candidate motion information list in this case is still less than the specified list length N, zero motion information is filled.

For a method for determining the motion information group of the current block based on the motion information group of the non-translational coding block or the motion information group of the translational coding block, refer to step 1.1 and step 1.2 in Embodiment 1. For brevity, details are not described herein again.

Optionally, both the first candidate motion information group and the second candidate motion information group are motion information of a first group of locations on the current coding block, and the at least two preset locations on the current coding block are a second group of locations; and the determining a candidate motion information list of a current coding block includes: when the second group of locations is different from the first group of locations, deriving the second candidate motion information group according to a location transformation formula and based on motion information corresponding to the second group of locations.

When a quantity of locations corresponding to the first candidate motion information group is the same as a quantity of locations corresponding to the second candidate motion information group, all the motion information groups in the candidate motion information list obtained according to this embodiment are motion information of specific locations. This reduces complexity of motion estimation.

Figure 5:
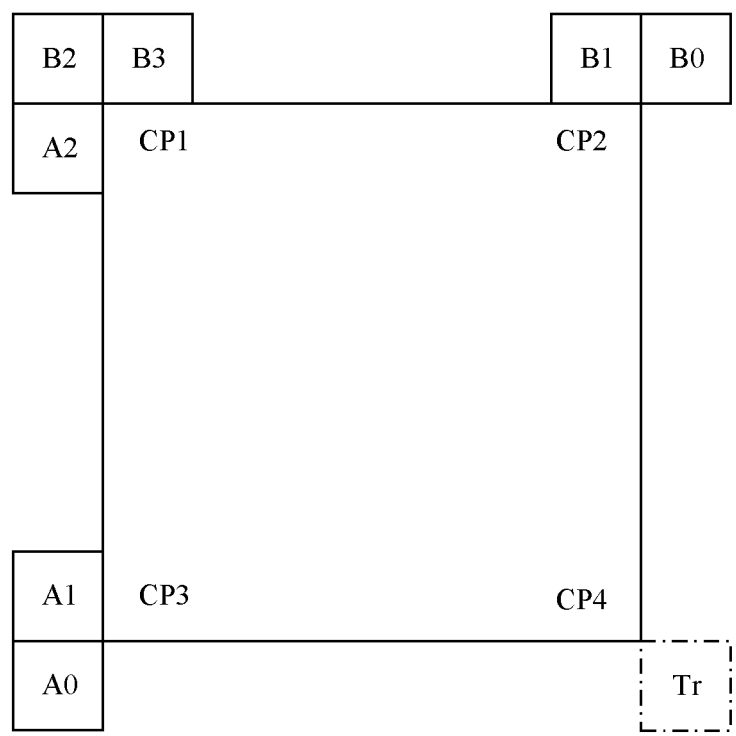
FIG. 5 is a schematic diagram of a method for constructing a combined control point-based motion information group according to this application.

FIG. 5 is used as an example. Assuming that the first candidate motion information group is motion information corresponding to $CP_1$ and $CP_2$, $CP_1$ and $CP_2$ are the first group of locations. If sample locations on which the second candidate motion information group is based are the location $A_1$ and the location $A_2$ (namely, the second group of locations), the encoder side may obtain, according to the location transformation formula and based on the motion information corresponding to the second group of locations, a second candidate motion information group corresponding to $CP_1$ and $CP_2$.

Optionally, the first candidate motion information group is motion information of a first group of locations on the current coding block, and the second candidate motion information group is motion information of a third group of locations on the current coding block; and the method further includes: when the first group of locations is different from the third group of locations, deriving a fifth candidate motion information group according to a location transformation formula and based on the second candidate motion information group, where locations corresponding to the fifth candidate motion information group are the same as the first group of locations.

When a quantity of locations corresponding to the first candidate motion information group is the same as a quantity of locations corresponding to the second candidate motion information group, all the motion information groups in the candidate motion information list obtained according to this embodiment are motion information of specific locations. This reduces complexity of motion estimation.

FIG. 5 is used as an example. Assuming that the first candidate motion information group is motion information corresponding to $CP_1$ and $CP_2$, $CP_1$ and $CP_2$ are the first group of locations. If the second candidate motion information group is motion information corresponding to $CP_2$ and $CP_3$ (namely, the third group of locations), the encoder side may obtain, according to the location transformation formula and based on $CP_2$ and $CP_3$, a second candidate motion information group corresponding to $CP_1$ and $CP_2$.

In Embodiment 1, Embodiment 2, and Embodiment 3, different combinations of control points may be transformed to control points at a same location.

For example, a 4-parameter affine model obtained by combining $\{CP_1, CP_4\}$, $\{CP_2, CP_3\}$, $\{CP_2, CP_4\}$, $\{CP_1, CP_3\}$, or $\{CP_3, CP_4\}$ is transformed to be represented by control points $\{CP_1, CP_2\}$. A transform method is: Motion vectors and coordinate information of the control points are substituted into formula (1), to obtain a model parameter; and then, coordination information of $\{CP_1, CP_2\}$ is substituted into the formula, to obtain motion vectors of $\{CP_1, CP_2\}$.

For example, a 6-parameter affine model obtained by combining $\{CP_1, CP_2, CP_4\}$, $\{CP_2, CP_3, CP_4\}$, or $\{CP_1, CP_3, CP_4\}$ is transformed to be represented by control points $\{CP_1, CP_2, CP_3\}$. A transform method is: Motion vectors and coordinate information of the control points are substituted into formula (3), to obtain a model parameter; and then, coordination information of $\{CP_1, CP_2, CP_3\}$ is substituted into the formula, to obtain motion vectors of $\{CP_1, CP_2, CP_3\}$.

Formula (1) and formula (3) are location transformation formulas.

The foregoing describes in detail the video data inter prediction method provided in this application. The following clearly describes, with reference to the accompanying drawings, a video encoding/decoding system, a video data encoding apparatus, and a video data decoding apparatus that are provided in this application.

Figure 7:
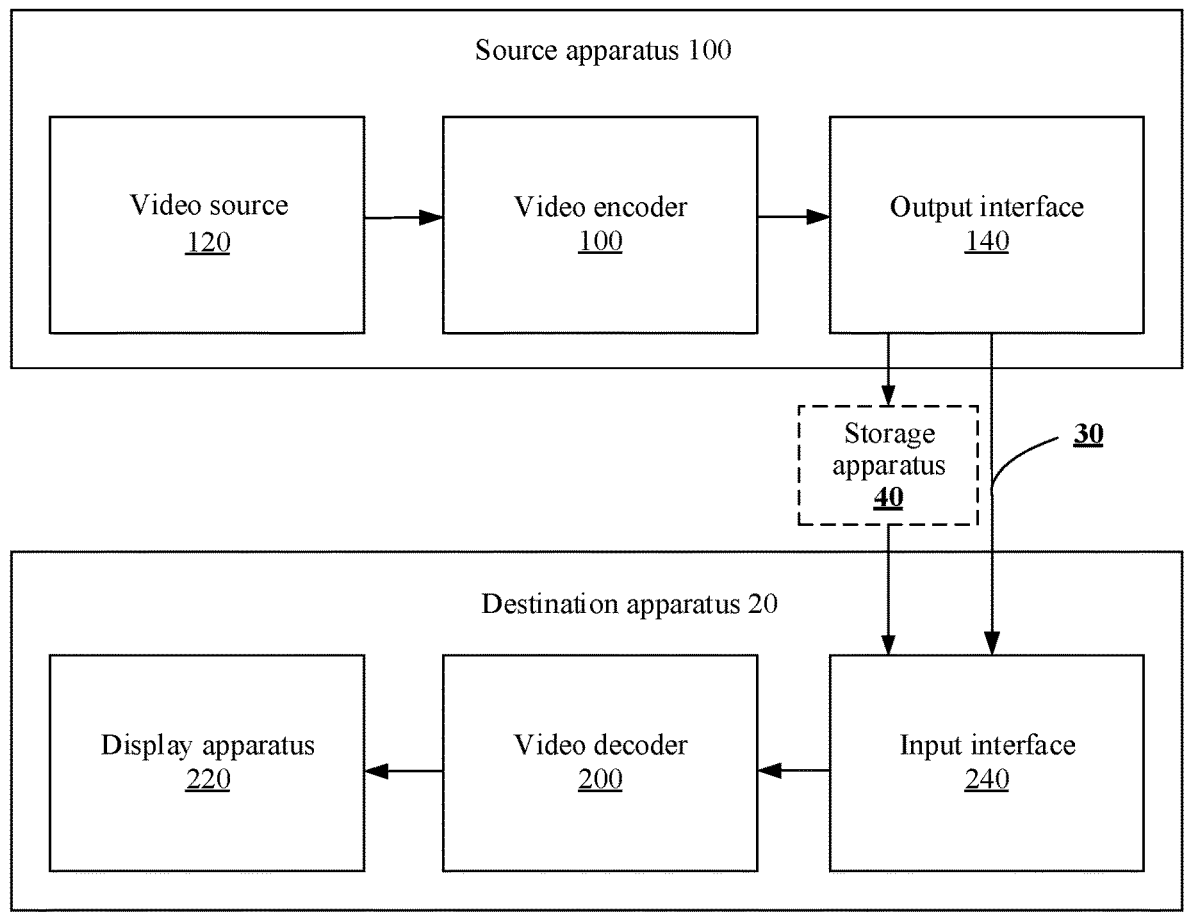
FIG. 7 is a schematic block diagram of a video encoding and decoding system according to this application.

FIG. 7 is a block diagram of an example video coding system 1 described in an embodiment of this application. As used in this specification, the term "video codec" usually refers to both a video encoder and a video decoder. In this application, the term "video coding" or "coding" may usually refer to video encoding or video decoding. A video encoder 100 and a video decoder 200 of the video coding system 1 are configured to predict motion information, for example, a motion vector, of a current coded picture block or a motion compensation subunit of a current coded picture block according to the inter prediction method provided in this application, so that the predicted motion vector approximates, to an utmost extent, a motion vector obtained by using a motion estimation method. This further improves encoding/decoding performance.

As shown in FIG. 7, the video coding system 1 includes a source apparatus 10 and a destination apparatus 20. The source apparatus 10 generates encoded video data. Therefore, the source apparatus 10 may be referred to as a video encoding apparatus. The destination apparatus 20 may decode the encoded video data generated by the source apparatus 10. Therefore, the destination apparatus 20 may be referred to as a video decoding apparatus. Various implementation solutions of the source apparatus 10, the destination apparatus 20, or both the source apparatus 10 and the destination apparatus 20 may include one or more processors and a memory coupled to the one or more processors. The memory may include but is not limited to a random access memory (random access memory, RAM), a read-only memory (read only memory, ROM), an erasable programmable read-only memory (erasable programmable ROM, EPROM), a flash memory, or any other medium that can be used to store required program code in a form of an instruction or a data structure accessible by a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone such as a so-called "smart" phone, a television set, a camera, a display apparatus, a digital media player, a video game console, a vehicle-mounted computer, and a similar apparatus.

The destination apparatus 20 may receive the encoded video data from the source apparatus 10 over a link 30. The link 30 may include one or more media or apparatuses that can move the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit modulated video data to the destination apparatus 20. The one or more communications media may include a wireless and/or wired communications medium, for example, a radio frequency (radio frequency, RF) spectrum or one or more physical transmission lines. The one or more communications media may constitute a part of a packet-based network, and the packet-based network is, for example, a local area network, a wide area network, or a global network (for example, the Internet). The one or more communications media may include a router, a switch, a base station, or another device facilitating communication from the source apparatus 10 to the destination apparatus 20.

In another example, the encoded video data may be output to a storage apparatus 40 through an output interface 140. Similarly, the encoded video data may be accessed from the storage apparatus 40 through an input interface 240. The storage apparatus 40 may include any one of a plurality of distributed data storage media or locally accessible data storage media, for example, a hard drive, a Blu-ray, a digital versatile disc (digital versatile disc, DVD), a compact disc read-only memory (CD-ROM), a flash memory, a volatile or nonvolatile memory, or any other proper digital storage medium configured to store the encoded video data.

In another example, the storage apparatus 40 may correspond to a file server or another intermediate storage apparatus that can maintain an encoded video data generated by the source apparatus 10. The destination apparatus 20 may access the stored video data from the storage apparatus 40 through streaming transmission or downloading. The file server may be any type of server that can store the encoded video data and transmit the encoded video data to the destination apparatus 20. An example of the file server includes a network server (which is, for example, used for a website), a file transfer protocol (file transfer protocol, FTP) server, a network attached storage (network attached storage, NAS) apparatus, or a local disk drive. The destination apparatus 20 may access the encoded video data through any standard data connection (including an Internet connection). The standard data connection may include a wireless channel (for example, a wireless fidelity (wireless-fidelity, Wi-Fi) connection), a wired connection (for example, a digital subscriber line (digital subscriber line, DSL) or a cable modem), or a combination of both that is suitable for accessing the encoded video data stored on the file server. Transmission of the encoded video data from the storage apparatus 40 may be streaming transmission, downloading transmission, or a combination of both.

A motion vector prediction technology in this application may be applied to video encoding and decoding, to support a plurality of multimedia applications, for example, over-the-air television broadcast, cable television transmission, satellite television transmission, streaming video transmission (for example, over the Internet), encoding of video data stored in a data storage medium, decoding of video data stored in a data storage medium, or another application. In some examples, the video coding system 1 may be configured to support unidirectional or bidirectional video transmission to support applications such as video streaming transmission, video playback, video broadcast, and/or video-telephony.

The video coding system 1 described in FIG. 7 is merely an example, and the technology in this application is applicable to a video coding device (for example, video encoding or video decoding) that does not necessarily include any data communication between an encoding apparatus and a decoding apparatus. In another example, data is retrieved from a local memory, is transmitted on a network in a streaming manner, and the like. The video encoding apparatus may encode the data and store the data in the memory, and/or the video decoding apparatus may retrieve the data from the memory and decode the data. In many examples, apparatuses that only encode data and store the data in the memory and/or retrieve the data from the memory and decode the data and that do not communicate with each other perform encoding and decoding.

In the example in FIG. 7, the source apparatus 10 includes a video source 120, the video encoder 100, and the output interface 140. In some examples, the output interface 140 may include a modulator/a demodulator (modem) and/or a transmitter. The video source 120 may include a video capture apparatus (for example, a camera), a video archive including previously captured video data, a video feed-in interface configured to receive video data from a video content provider, and/or a computer graphics system for generating video data, or a combination of these sources of video data.

The video encoder 100 may encode video data from the video source 120. In some examples, the source apparatus 10 directly transmits encoded video data to the destination apparatus 20 through the output interface 140. In another example, the encoded video data may alternatively be stored on the storage apparatus 40, so that the destination apparatus 20 subsequently accesses the encoded video data for decoding and/or playing.

In the example in FIG. 7, the destination apparatus 20 includes the input interface 240, the video decoder 200, and a display apparatus 220. In some examples, the input interface 240 includes a receiver and/or a modem. The input interface 240 may receive the encoded video data over the link 30 and/or from the storage apparatus 40. The display apparatus 220 may be integrated with the destination apparatus 20 or may be located outside the destination apparatus 20. Generally, the display apparatus 220 displays decoded video data. The display apparatus 220 may include a plurality of display apparatuses, for example, a liquid crystal display (liquid crystal display, LCD), a plasma display, an organic light-emitting diode (organic light-emitting diode, OLED) display, or a display apparatus of another type.

Although not shown in FIG. 7, in some aspects, the video encoder 100 and the video decoder 200 may be respectively integrated with an audio encoder and an audio decoder, and may include a proper multiplexer-demultiplexer unit or other hardware and software, to handle coding of audio and a video that are in a same data stream or separate data streams. In some examples, if applicable, a multiplex-demultiplex (multiplex-demultiplex, MUX-DEMUX) unit may comply with an ITU H.223 multiplexer protocol, or another protocol such as a user datagram protocol (user datagram protocol, UDP).

The video encoder 100 and the video decoder 200 each may be implemented as any one of a plurality of following circuits, for example, one or more microprocessors, a digital signal processor (digital signal processor, DSP), an application-specific integrated circuit (application-specific integrated circuit, ASIC), a field programmable gate array (field programmable gate array, FPGA), discrete logic, hardware, or any combination thereof. If this application is implemented partially by using software, the apparatus may store, in a proper non-volatile computer-readable storage medium, an instruction used for the software, and may use one or more processors to execute the instruction in hardware, to implement the technology in this application. Any one of the foregoing content (including hardware, software, a combination of hardware and software, and the like) may be considered as one or more processors. The video encoder 100 and the video decoder 200 each may be included in one or more encoders or decoders, and either the encoder or the decoder may be integrated into a combined encoder/decoder (codec) in a corresponding apparatus as a part of the combined encoder/decoder.

In this application, the video encoder 100 may be generally referred to as another apparatus "signaling" or "transmitting" some information to, for example, the video decoder 200. The term "signaling" or "transmitting" may roughly refer to transfer of a syntax element and/or other data used to decode compressed video data. The transfer may occur in real time or almost in real time. Alternatively, the communication may occur after a period of time, for example, may occur when a syntax element in an encoded bitstream is stored into a computer-readable storage medium during encoding, and then, the decoding apparatus may retrieve the syntax element at any time after the syntax element is stored into the medium.

The video encoder 100 and the video decoder 200 may operate according to a video compression standard, such as high efficiency video coding (HEVC), or an extension thereof, and may comply with an HEVC test model (HM). Alternatively, the video encoder 100 and the video decoder 200 may operate according to other industry standards, for example, ITU-T H.264 and H.265 standards, or extensions of such standards. However, the technology in this application is not limited to any specific encoding and decoding standard.

In an example, referring to FIG. 4, the video encoder 100 is configured to encode a syntax element related to a current coding picture block into a digital video output bitstream (referred to as a bitstream or a stream for short). Herein, a syntax element used for inter prediction of the current picture block is briefly referred to as inter prediction data, and the inter prediction data may include index information used to indicate target motion information. To determine the target motion information used to encode the current picture block, the video encoder 100 is further configured to: determine or generate a candidate motion information list (S410), and determine the target motion information from the candidate motion information list according to a screening rule (for example, RDO) (S420). The video encoder 100 is further configured to encode the current picture block based on the determined target motion information group (S430). The encoding process herein may include: predicting motion information of each motion compensation subunit (which may also be referred to as a basic motion compensation unit) in the current picture block based on the determined target motion information group, and performing inter prediction on the current picture block by using motion information of one or more motion compensation subunits in the current picture block.

It should be understood that, a basic motion compensation unit is a minimum unit for performing motion compensation, and the unit has uniform motion information. In the embodiments of the present invention, a sample is used as a basic motion compensation unit. A sample matrix or the like may alternatively be used as a basic motion compensation unit. This is not limited in this application.

It should be understood that, when the video encoder performs inter prediction by using an AMVP mode, if a difference (that is, a residual) between the current coding picture block (that is, an original block) and a prediction block generated based on motion information predicted based on the new inter prediction method proposed in this application is 0, the video encoder 100 needs to encode only the syntax element related to the current coding picture block into the bitstream (also referred to as a stream); otherwise, in addition to the syntax element, the corresponding residual further needs to be encoded into the bitstream. When the video encoder performs inter prediction by using a merge mode, only index information of the target motion information needs to be encoded into the bitstream.

In another example, referring to FIG. 4, the video decoder 200 is configured to: decode a bitstream to obtain a syntax element related to a current coding picture block, and determine a candidate motion information list (S410). Herein, a syntax element used for inter prediction of the current picture block is briefly referred to as inter prediction data, and the inter prediction data includes index information used to determine target motion information. The video decoder 200 determines the target motion information based on the index information in the inter prediction data (S420), and decodes the current picture block based on the determined target motion information group (S430). The decoding process herein may include: predicting motion information of one or more basic motion compensation units in the current picture block based on the determined target motion information group, and performing inter prediction on the current picture block by using the motion information of the one or more basic motion compensation units in the current picture block.

Optionally, the candidate motion information list determined by the video decoder 200 may be a complete list (that is, a list that is the same as the candidate motion information list determined by the video encoder), or may be an incomplete list, for example, a partial list including the target motion information. For example, if an index value that is carried in the bitstream and that is used to determine the target motion information is 3, the determined incomplete list includes candidate motion information groups whose index values are 0, 1, 2, and 3, but may not include candidate motion information groups whose index values are 4, 5, and the like.

It can be learned from the foregoing that, the video encoder 100 and the video decoder 200 provided in this application construct the candidate motion information list including two types of candidate motion information groups. The two types of candidate motion information groups have index information that is uniformly orchestrated. If one of the two types of candidate motion information groups is not applicable to the current picture block, the video encoder 100 may select the target motion information from the other type of candidate motion information group included in the candidate motion information list, and send the index information of the target motion information to the video decoder 200 by using the bitstream. Because the candidate motion information group in the candidate motion information list has unique index information, the video encoder 100 does not need to transfer, in the bitstream, indication information indicating a candidate motion information list construction method used by the video encoder 100. This reduces bit overheads of video transmission.

Figure 8:
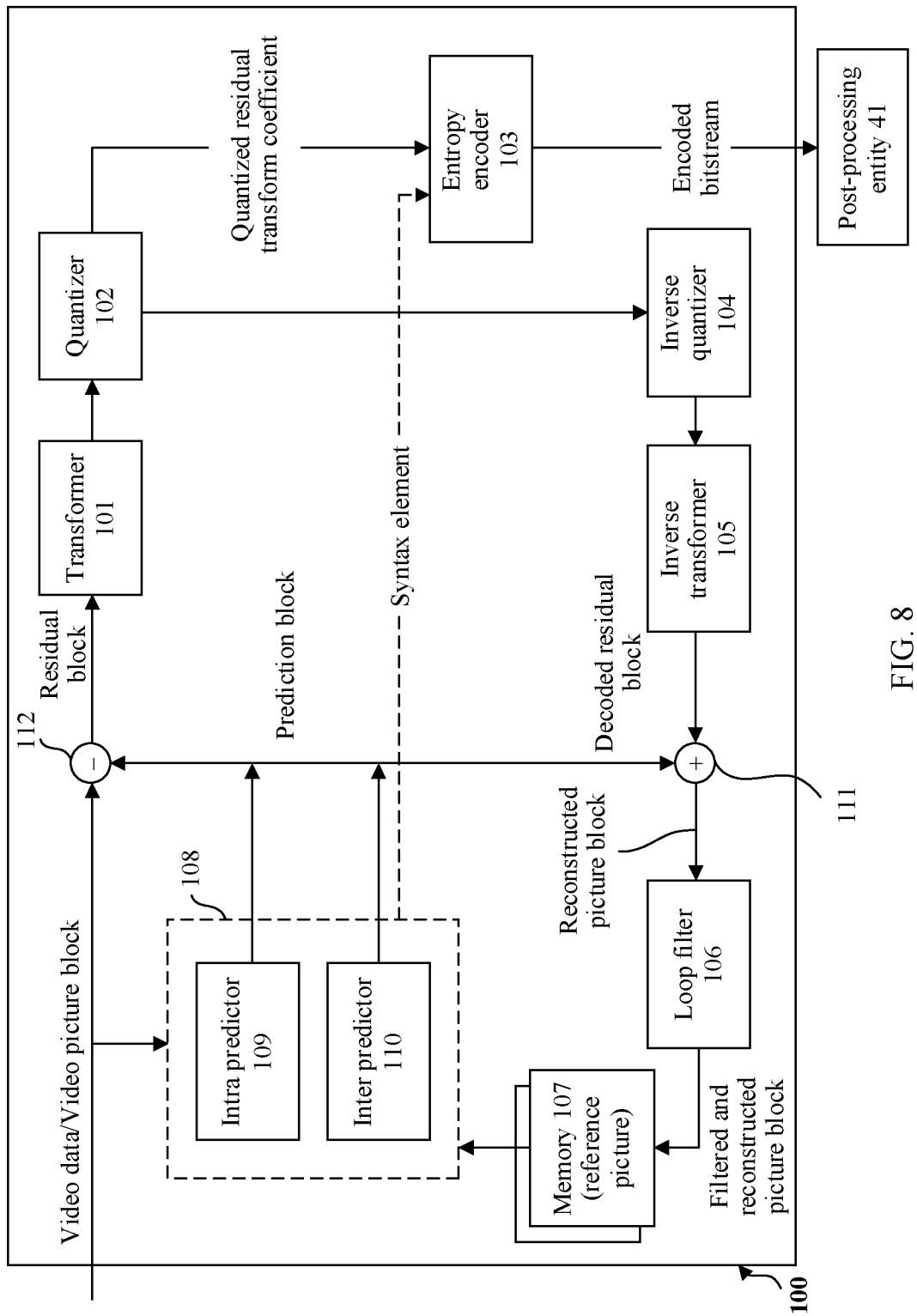
FIG. 8 is a schematic block diagram of a video encoder according to this application.

FIG. 8 is a block diagram of an example video encoder 100 according to an embodiment of this application. The video encoder 100 is configured to output a video to a post-processing entity 41. The post-processing entity 41 represents an instance of a video entity that can process encoded video data from the video encoder 100, for example, a media aware network element (MANE) or a splicing apparatus/an editing apparatus. In some cases, the post-processing entity 41 may be an instance of a network entity. In some video encoding systems, the post-processing entity 41 and the video encoder 100 may be parts of separate apparatuses, while in other cases, a function described with reference to the post-processing entity 41 may be performed by a same apparatus including the video encoder 100. In an example, the post-processing entity 41 is an instance of the storage apparatus 40 in FIG. 7.

The video encoder 100 may perform video picture block inter prediction according to the method provided in this application.

In the example in FIG. 8, the video encoder 100 includes a prediction processing unit 108, a filter unit 106, a decoded picture buffer (decoded picture buffer, DPB) 107, a summator 112, a transformer 101, a quantizer 102, and an entropy encoder 103. The prediction processing unit 108 includes an inter predictor 110 and an intra predictor 109. For picture block reconstruction, the video encoder 100 further includes an inverse quantizer 104, an inverse transformer 105, and a summator 111. The filter unit 106 is intended to represent one or more loop filters, for example, a deblocking filter, an adaptive loop filter (adaptive loop filter, ALF), and a sample adaptive offset (sample adaptive offset, SAO) filter. Although the filter unit 106 is shown as an in-loop filter in FIG. 8, in another implementation, the filter unit 106 may be implemented as a post-loop filter. In an example, the video encoder 100 may further include a video data memory and a partitioning unit (which are not shown in the figure).

The video data memory may store video data that is to be encoded by a component of the video encoder 100. The video data stored in the video data memory may be obtained from a video source 120. The DPB 107 may be a reference picture memory that stores reference video data used for encoding the video data by the video encoder 100 in intra and inter coding modes. The video data memory and the DPB 107 each may be constituted by any one of a plurality of memory apparatuses, for example, a dynamic random access memory (DRAM) including a synchronous DRAM (SDRAM), a magnetoresistive RAM (MRAM), a resistive RAM (RRAM), or another type of memory apparatus. The video data memory and the DPB 107 may be provided by a same memory apparatus or separate memory apparatuses. In various examples, the video data memory may be located on a chip with other components of the video encoder 100, or may be located outside the chip relative to those components.

As shown in FIG. 8, the video encoder 100 receives video data and stores the video data in the video data memory. The partitioning unit partitions the video data into several picture blocks, and these picture blocks may be further partitioned into smaller blocks, for example, through picture block partitioning based on a quadtree structure or a binary-tree structure. The partitioning may further include partitioning into slices (slice), tiles (tile), or other larger units. The video encoder 100 usually includes a component for encoding a picture block in a coding video slice. The slice may be divided into a plurality of picture blocks (and may be divided into picture block sets referred to as tiles). The prediction processing unit 108 (which is specifically an inter prediction unit 110 in the prediction processing unit 108) may determine a candidate motion information list of the current picture block, determine target motion information from the candidate motion information list according to a screening rule, and perform inter prediction on the current picture block based on the target motion information. The prediction processing unit 108 may provide a block obtained after intra decoding and inter decoding to the summator 112, to generate a residual block, and the block is provided to the summator 111 to reconstruct a coded block used as a reference picture. In addition, the prediction processing unit 108 (which is specifically the inter prediction unit 110) may send index information of the target motion information to the entropy encoder 103, so that the entropy encoder 103 encodes the index information of the target motion information into a bitstream.

The intra predictor 109 in the prediction processing unit 108 may perform intra predictive encoding on the current picture block relative to one or more neighboring blocks in a same frame or slice as the current coding block, to remove spatial redundancy. The inter predictor 110 in the prediction processing unit 108 may perform inter predictive encoding on the current picture block relative to one or more prediction blocks in one or more reference pictures, to remove temporal redundancy.

Specifically, the inter predictor 110 may be configured to determine the target motion information. For example, the inter predictor 110 may calculate, through rate-distortion analysis, a rate-distortion value of each motion information group in the candidate motion information list, and select a motion information group having an optimal rate-distortion characteristic from the candidate motion information list. Rate-distortion analysis is usually to determine an amount of distortion (or error) between a coded block and an original block that has not been encoded and that is to be encoded to generate the coded block, and determine a bit rate (that is, a quantity of bits) used to generate the coded block. For example, the inter predictor 110 may determine a motion information group in the candidate motion information list as the target motion information used to perform inter prediction on the current picture block, where a rate-distortion cost is lowest when the motion information group in the candidate motion information list is used to encode the current picture block. The following describes in detail an inter predictive encoding process.

The inter predictor 110 is configured to predict motion information (for example, a motion vector) of one or more basic motion compensation units in the current picture block based on the determined target motion information group, and obtain or generate a prediction block of the current picture block by using the motion information (for example, the motion vector) of the one or more basic motion compensation units in the current picture block. The inter predictor 110 may locate, in one reference picture in a reference picture list, the prediction block to which the motion vector points. The inter predictor 110 may further generate a syntax element associated with the picture block and a video slice, for use by a video decoder 200 when decoding the picture block of the video slice. Alternatively, in an example, the inter predictor 110 performs a motion compensation process by using motion information of each basic motion compensation unit, to generate a prediction block of each basic motion compensation unit, to obtain the prediction block of the current picture block. It should be understood that the inter predictor 110 herein performs a motion estimation process and the motion compensation process.

Specifically, after selecting the target motion information for the current picture block, the inter predictor 110 may provide, to the entropy encoder 103, information indicating the target motion information of the current picture block, so that the entropy encoder 103 encodes the information indicating the selected target motion information group. In this application, the entropy encoder 103 may add, into a transmitted bitstream, inter prediction data related to the current picture block, and the inter prediction data may include index information, to indicate the target motion information selected from the candidate motion information list.

The intra predictor 109 may perform intra prediction on the current picture block. Specifically, the intra predictor 109 may determine an intra prediction mode used to encode the current block. For example, the intra predictor 109 may calculate a rate-distortion value of each to-be-tested candidate motion information group through rate-distortion analysis, and select an intra prediction mode with an optimal rate-distortion characteristic from to-be-tested modes. In any case, after selecting the target motion information for the picture block, the intra predictor 109 may provide the target motion information of the current picture block to the entropy encoder 103, so that the entropy encoder 103 encodes the target motion information.

After the prediction processing unit 108 generates the prediction block of the current picture block through inter prediction and intra prediction, the video encoder 100 subtracts the prediction block from the current coding picture block to form a residual picture block. The summator 112 represents one or more components that perform such a subtraction operation. Residual video data in the residual block may be included in one or more TUs and applied to the transformer 101. The transformer 101 transforms the residual video data into a residual transform coefficient through transform such as discrete cosine transformation (DCT) or conceptually similar transform. The transformer 101 may transform the residual video data from a sample value domain to a transform domain, for example, a frequency domain.

The transformer 101 may send an obtained transform coefficient to the quantizer 102. The quantizer 102 quantizes the transform coefficient to further reduce a bit rate. In some examples, the quantizer 102 may then scan a matrix including a quantized transform coefficient. Alternatively, the entropy encoder 103 may perform scanning.

After quantization, the entropy encoder 103 performs entropy coding on the quantized transform coefficient. For example, the entropy encoder 103 may perform context-adaptive variable-length coding (context adaptive variable length coding, CAVLC), context-adaptive binary arithmetic coding (context adaptive binary arithmetic coding, CABAC), syntax-based context-adaptive binary arithmetic coding (SBAC), probability interval partitioning entropy (PIPE) coding, or another entropy coding method or technology. After the entropy encoder 103 performs entropy coding, the encoded bitstream may be transmitted to the video decoder 200, or archived for subsequent transmission, or retrieved by the video decoder 200. The entropy encoder 103 may further perform entropy coding on a syntax element of the coding current picture block, for example, encode the target motion information into the bitstream.

The inverse quantizer 104 and the inverse transformer 105 respectively apply inverse quantization and inverse transform, to reconstruct the residual block in a sample domain, for example, the residual block is to be used as a reference block of a reference picture subsequently. The summator 111 adds the reconstructed residual block to the prediction block generated by the inter predictor 110 or the intra predictor 109, to generate a reconstructed picture block. The filter unit 106 is applicable to the reconstructed picture block to reduce distortion such as block artifacts (block artifacts). Then, the reconstructed picture block is stored as the reference block in the decoded picture buffer 107, and may be used as the reference block by the inter predictor 110 to perform inter prediction on a block in a subsequent video frame or picture.

It should be understood that other structural variations of the video encoder 100 may be used to encode a video stream. For example, for some picture blocks or picture frames, the video encoder 100 may directly quantize a residual signal without processing by the transformer 101, and correspondingly, without processing by the inverse transformer 105. Alternatively, for some picture blocks or picture frames, the video encoder 100 does not generate residual data, and correspondingly, processing by the transformer 101, the quantizer 102, the inverse quantizer 104, and the inverse transformer 105 is not required. Alternatively, the video encoder 100 may directly store the reconstructed picture block as the reference block without processing by the filter unit 106. Alternatively, the quantizer 102 and the inverse quantizer 104 in the video encoder 100 may be combined.

Figure 9:
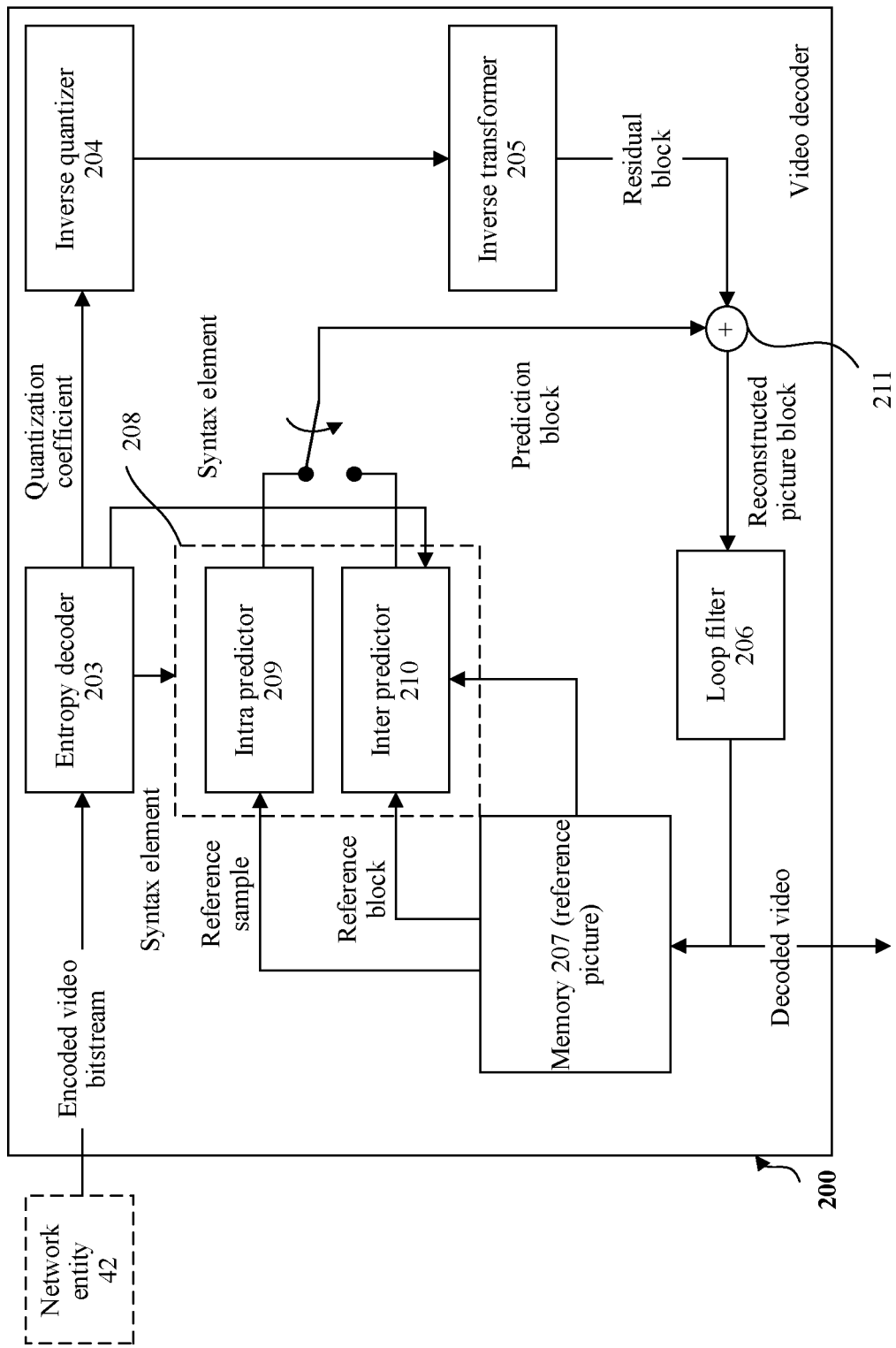
FIG. 9 is a schematic block diagram of a video decoder according to this application.

FIG. 9 is a block diagram of an example video decoder 200 according to an embodiment of this application. In the example in FIG. 9, the video decoder 200 includes an entropy decoder 203, a prediction processing unit 208, an inverse quantizer 204, an inverse transformer 205, a summator 211, a filter unit 206, and a decoded picture buffer 207. The prediction processing unit 208 may include an inter predictor 210 and an intra predictor 209. In some examples, the video decoder 200 may perform a decoding process that is substantially inverse to the encoding process described with reference to the video encoder 100 in FIG. 8.

During decoding, the video decoder 200 receives, from the video encoder 100, an encoded video bitstream representing a picture block of an encoded video slice and an associated syntax element. The video decoder 200 may receive video data from a network entity 42, and optionally, may further store the video data in a video data memory (which is not shown in the figure). The video data memory may store video data that is to be decoded by a component of the video decoder 200, for example, the encoded video bitstream. The video data stored in the video data memory, for example, may be obtained from a local video source such as a storage apparatus 40 or a camera, through wired or wireless network communication of the video data, or by accessing a physical data storage medium. The video data memory may be used as a decoded picture buffer (CPB) configured to store encoded video data from the encoded video bitstream. Therefore, although the video data memory is not shown in FIG. 9, the video data memory and the DPB 207 may be a same memory, or may be separately disposed memories. The video data memory and the DPB 207 each may be constituted by any one of a plurality of memory apparatuses, for example, a dynamic random access memory (DRAM) including a synchronous DRAM (SDRAM), a magnetoresistive RAM (MRAM), a resistive RAM (RRAM), or another type of memory apparatus. In various examples, the video data memory may be integrated on a chip with other components of the video decoder 200, or may be disposed outside the chip relative to those components.

The network entity 42 may be, for example, a server, a MANE, a video editor/splicer, or another such apparatus configured to implement one or more of the technologies described above. The network entity 42 may or may not include a video encoder, for example, the video encoder 100. Before the network entity 42 sends the encoded video bitstream to the video decoder 200, the network entity 42 may implement a part of the technologies described in this application. In some video decoding systems, the network entity 42 and the video decoder 200 may be parts of separate apparatuses, while in other cases, a function described with reference to the network entity 42 may be performed by a same apparatus including the video decoder 200. In some cases, the network entity 42 may be an instance of the storage apparatus 40 in FIG. 7.

The entropy decoder 203 of the video decoder 200 performs entropy decoding on the bitstream to generate a quantized coefficient and some syntax elements. The entropy decoder 203 forwards the syntax elements to the prediction processing unit 208. The video decoder 200 may receive a syntax element and/or syntax elements at a video slice level and/or a picture block level. In this application, in an example, the syntax element herein may include target motion information related to a current picture block.

When the video slice is decoded to obtain an intra-decoded (I) slice, the intra predictor 209 of the prediction processing unit 208 may generate a prediction block of the picture block of the current video slice based on a signaled intra prediction mode and data of a previously decoded block that is from a current frame or picture. When the video slice is decoded to obtain an inter-decoded (that is, B or P) slice, the inter predictor 210 of the prediction processing unit 208 may determine, based on the syntax element received from the entropy decoder 203, the target motion information used to decode the current picture block of the current video slice, and decode (for example, perform inter prediction on) the current picture block based on the determined target motion information group. Specifically, the inter predictor 210 may determine whether to use a new inter prediction method to predict the current picture block of the current video slice (specifically, whether to determine a candidate motion information list by using the method in this application); and if the syntax element instructs to use the new inter prediction method to predict the current picture block, the inter predictor 210 predicts a motion information group of the current picture block of the current video slice or a basic motion compensation unit of the current picture block based on the new inter prediction method (for example, a new inter prediction method specified by the syntax element or a default new inter prediction method), so as to obtain or generate, in a motion compensation process, a prediction block of the current picture block or the basic motion compensation unit of the current picture block by using the predicted motion information group of the current picture block or the basic motion compensation unit of the current picture block. The motion information group herein may include reference picture information and a motion vector. The reference picture information may include but is not limited to unidirectional/bidirectional prediction information, a reference picture list number, and a reference picture index corresponding to a reference picture list. For inter prediction, the prediction block may be generated from one of reference pictures in one of reference picture lists. The video decoder 200 may construct, based on reference pictures stored in the DPB 207, reference picture lists, namely, a list 0 and a list 1. A reference index of the current picture may be included in one or more of a reference frame list 0 and a reference frame list 1. In some examples, the video encoder 100 may signal to indicate whether to decode a specific syntax element of a specific block by using the new inter prediction mode, or may signal to indicate whether to use the new inter prediction mode and indicate a specific new inter prediction mode used to decode a specific syntax element of a specific block. It should be understood that the inter predictor 210 herein performs the motion compensation process. The foregoing method embodiments have described in detail an inter prediction process of predicting the motion information group of the current picture block or the basic motion compensation unit of the current picture block by using an affine model (for example, a rotational scaling affine model) of two control points (4 parameters), or an affine model (for example, a rotational scaling affine model) of three control points (6 parameters), or an affine model (for example, a perspective affine model) of four control points (8 parameters).

The inverse quantizer 204 performs inverse quantization on, that is, dequantizes, a quantized transform coefficient provided in the bitstream and obtained through decoding by the entropy decoder 203. An inverse quantization process may include: determining a to-be-applied quantization degree by using a quantization parameter calculated by the video encoder 100 for each picture block in the video slice, and similarly determining a to-be-applied inverse quantization degree. The inverse transformer 205 applies inverse transform, for example, inverse DCT, inverse integer transform, or a conceptually similar inverse transform process, to the transform coefficient, so as to generate a residual block in a sample domain.

After the inter predictor 210 generates a prediction block used for the current picture block or a sub-block of the current picture block, the video decoder 200 obtains a reconstructed block, that is, a decoded picture block, by calculating a sum of the residual block that is from the inverse transformer 205 and the corresponding prediction block that is generated by the inter predictor 210. The summator 211 represents a component that performs such a summation operation. When necessary, a loop filter (in a decoding loop or after a decoding loop) may be further used to make sample transition smooth or improve video quality in another manner. The filter unit 206 may represent one or more loop filters, for example, a deblocking filter, an adaptive loop filter (ALF), and a sample adaptive offset (SAO) filter. Although the filter unit 206 is shown as an in-loop filter in FIG. 9, in another implementation, the filter unit 206 may be implemented as a post-loop filter. In an example, the filter unit 206 is applicable to block reconstruction to reduce block distortion, and the result is output as a decoded video stream. In addition, a decoded picture block in a given frame or picture may be further stored in the decoded picture buffer 207, and the decoded picture buffer 207 stores a reference picture used for subsequent motion compensation. The decoded picture buffer 207 may be a part of a memory, and may further store a decoded video for subsequent presentation on a display apparatus (for example, the display apparatus 220 in FIG. 7); or may be separated from such a memory.

It should be understood that other structural variations of the video decoder 200 may be used to decode the encoded video bitstream. For example, the video decoder 200 may generate an output video stream without processing by the filter unit 206. Alternatively, for some picture blocks or picture frames, the entropy decoder 203 of the video decoder 200 does not obtain a quantized coefficient through decoding, and correspondingly, processing by the inverse quantizer 204 and the inverse transformer 205 is not required.

Figure 10:
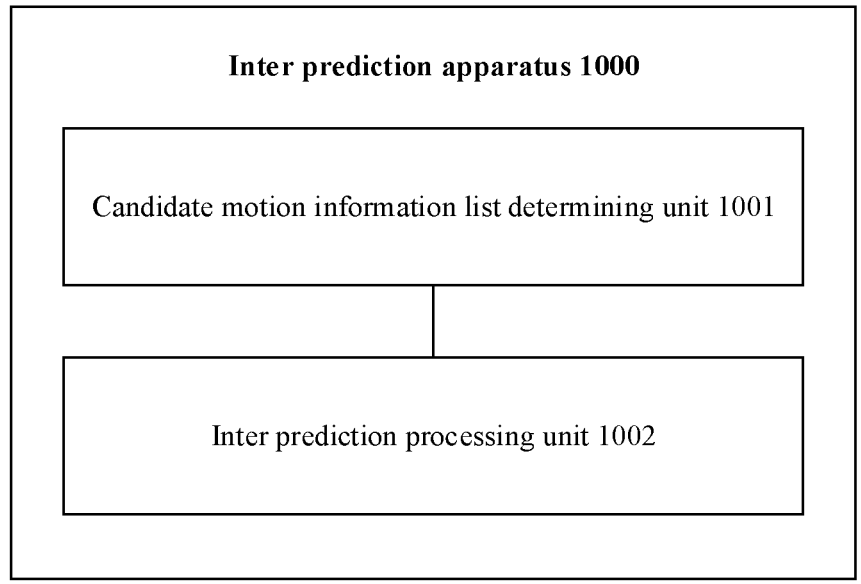
FIG. 10 is a schematic block diagram of a video data inter prediction apparatus according to this application.

FIG. 10 is a schematic block diagram of an inter prediction apparatus 1000 according to an embodiment of this application. It should be noted that the inter prediction apparatus 1000 is not only applicable to inter prediction for decoding a video picture, but also applicable to inter prediction for encoding a video picture. It should be understood that the inter prediction apparatus 1000 herein may correspond to the inter predictor 110 in FIG. 8, or may correspond to the inter predictor 210 in FIG. 9. The inter prediction apparatus 1000 may include:

a candidate motion information list determining unit 1001, configured to determine a candidate motion information list of a current picture block, where the candidate motion information list includes at least one first candidate motion information group, at least one second candidate motion information group, and a plurality of pieces of index information used to index the first candidate motion information group and the second candidate motion information group, the first candidate motion information group is a motion information group determined based on motion information of preset locations on a first neighboring picture block of the current picture block and a motion model of the first neighboring picture block, the second candidate motion information group is a set of motion information of at least two sample locations that are respectively neighboring to at least two preset locations on the current picture block, and the at least two sample locations are located on at least one second neighboring picture block of the current picture block; and an inter prediction processing unit 1002, configured to: determine target motion information from the candidate motion information list; and perform inter prediction on the current picture block based on the target motion information.

It can be learned that the inter prediction apparatus 1000 constructs the candidate motion information list including two types of candidate motion information groups. The two types of candidate motion information groups have index information that is uniformly orchestrated. If one of the two types of candidate motion information groups is not applicable to the current picture block, an encoder side may select the target motion information from the other type of candidate motion information group included in the candidate motion information list, and send index information of the target motion information to a decoder side by using a bitstream. Because the candidate motion information group in the candidate motion information list has unique index information, the encoder side does not need to transfer, in the bitstream, indication information indicating a motion estimation method used by the encoder side. This reduces bit overheads of video transmission.

In a feasible implementation, a quantity of bits of first index information in the plurality of pieces of index information is less than a quantity of bits of second index information in the plurality of pieces of index information, the first index information corresponds to a motion information group that is first added into the candidate motion information list, and the second index information corresponds to a motion information group that is later added into the candidate motion information list; and the inter prediction processing unit 1002 is specifically configured to: first add the first candidate motion information group into the candidate motion information list, and then add the second candidate motion information group into the candidate motion information list.

The first candidate motion information group is a motion model-based motion information group, and efficiency of performing encoding/decoding based on the first candidate motion information group is higher than efficiency of performing encoding/decoding based on the second candidate motion information group. Therefore, there is a relatively high probability that the first candidate motion information group is the target motion information. In this way, index information of the first candidate motion information group may be set to index information with a relatively small quantity of bits. This helps reduce bit overheads of video transmission.

In some possible implementation scenarios, if first neighboring picture blocks include a first neighboring picture block using a translational motion model and a first neighboring picture block using a non-translational motion model, a quantity of bits of first index information in the plurality of pieces of index information is less than a quantity of bits of second index information in the plurality of pieces of index information, the first index information corresponds to a motion information group that is first added into the candidate motion information list, and the second index information corresponds to a motion information group that is later added into the candidate motion information list, the inter prediction processing unit 1002 is specifically configured to:

when a quantity of first neighboring picture blocks using the non-translational motion model is greater than or equal to a quantity threshold, derive, based on motion information of at least two preset locations on the first neighboring picture block using the non-translational motion model and the motion model of the first neighboring picture block using the non-translational motion model, motion information of at least two preset locations corresponding to the current picture block, add the motion information of the at least two preset locations corresponding to the current picture block into the candidate motion information list as a first candidate motion information group, and then add the second candidate motion information group into the candidate motion information list.

If the quantity of first neighboring picture blocks using the non-translational motion model is greater than or equal to the quantity threshold, it indicates that there is a relatively high probability that the current picture block is a picture block using the non-translational motion model. Therefore, the first candidate motion information group derived based on the first neighboring picture block using the non-translational motion model may be first added into the candidate motion information list, and then the second candidate motion information group is added into the candidate motion information list. A length of bin string of index information of a motion information group that is first added into the candidate motion information list is relatively small, and there is a relatively high probability that the target motion information is the motion information group that is first added into the candidate motion information list. Therefore, this helps reduce bit overheads of video transmission.

In some feasible implementations, in the aspect of determining the candidate motion information list, the inter prediction processing unit 1002 is specifically configured to:

when a length of the candidate motion information list is less than a length threshold, and first neighboring picture blocks further include a first neighboring picture block using a translational motion model, further add a motion information group of the first neighboring picture block using the translational motion model into the candidate motion information list as a first candidate motion information group; and if the length of the candidate motion information list is still less than the length threshold, add zero motion information into the candidate motion information list.

In some possible implementation scenarios, if first neighboring picture blocks include a first neighboring picture block using a translational motion model and a first neighboring picture block using a non-translational motion model, a quantity of bits of first index information in the plurality of pieces of index information is less than a quantity of bits of second index information in the plurality of pieces of index information, the first index information corresponds to a motion information group that is first added into the candidate motion information list, and the second index information corresponds to a motion information group that is later added into the candidate motion information list, the inter prediction processing unit 1002 is specifically configured to:

when a quantity of first neighboring picture blocks using the non-translational motion model is less than or equal to a quantity threshold, first add a motion information group of the first neighboring picture block using the translational motion model into the candidate motion information list as a first candidate motion information group, and then add the second candidate motion information group into the candidate motion information list.

If the quantity of first neighboring picture blocks using the non-translational motion model is less than or equal to the quantity threshold, it indicates that there is a relatively high probability that the current picture block is a picture block using the translational motion model. Therefore, the motion information group of the first neighboring picture block using the translational motion model may be first added into the candidate motion information list as the first candidate motion information group, and then the second candidate motion information group is added into the candidate motion information list. A length of bin string of index information of a motion information group that is first added into the candidate motion information list is relatively small, and there is a relatively high probability that the target motion information is the motion information group that is first added into the candidate motion information list. Therefore, this helps reduce bit overheads of video transmission.

In some feasible implementations, in the aspect of determining the candidate motion information list, the inter prediction processing unit 1002 is specifically configured to:

when a length of the candidate motion information list is less than a length threshold, and first neighboring picture blocks further include a first neighboring picture block using a non-translational motion model, further derive, based on motion information of at least two preset locations on the first neighboring picture block using the non-translational motion model and the motion model of the first neighboring picture block using the non-translational motion model, motion information of the at least two preset locations on the current picture block, and add the motion information of the at least two preset locations on the current picture block into the candidate motion information list as a first candidate motion information group; and if the length of the candidate motion information list is still less than the length threshold, add zero motion information into the candidate motion information list.

In some possible implementation scenarios, both the first candidate motion information group and the second candidate motion information group are motion information of a first group of locations on the current picture block, and the at least two preset locations on the current picture block are a second group of locations; and the inter prediction processing unit 1002 is specifically configured to:
when the second group of locations is different from the first group of locations, derive the second candidate motion information group according to a location transformation formula and based on motion information corresponding to the second location.

When a quantity of locations corresponding to the first candidate motion information group is the same as a quantity of locations corresponding to the second candidate motion information group, all the motion information groups in the candidate motion information list obtained according to this embodiment are motion information of same locations. This reduces complexity of motion estimation.

In some possible implementation scenarios, the first candidate motion information group is motion information of a first group of locations on the current picture block, and the second candidate motion information group is motion information of a third group of locations on the current picture block; and the inter prediction processing unit 1002 is further configured to:
when the first group of locations is different from the third group of locations, derive a fifth candidate motion information group according to a location transformation formula and based on the second candidate motion information group, where locations corresponding to the fifth candidate motion information group are the same as the first group of locations.

When a quantity of locations corresponding to the first candidate motion information group is the same as a quantity of locations corresponding to the second candidate motion information group, all the motion information groups in the candidate motion information list obtained according to this embodiment are motion information of same locations. This reduces complexity of motion estimation.

When the apparatus 1000 is configured to decode a video picture, the apparatus 1000 may further include:
an inter prediction data obtaining unit (which is not shown in the figure), configured to receive the index information used to determine the target motion information. Correspondingly, the inter prediction processing unit 1002 is specifically configured to determine target motion information from the candidate motion information list based on the index information of the target motion information.

When the apparatus 1000 is configured to encode a video picture,
the inter prediction processing unit 1002 is specifically configured to determine the target motion information from the candidate motion information list according to a screening rule, for example, determine a motion information group in the candidate motion information list as the target motion information used to perform inter prediction on the current picture block, where a rate-distortion cost is lowest when the motion information group in the candidate motion information list is used to encode the current picture block.

It should be noted that modules in the inter prediction apparatus in this embodiment of this application are functional bodies for implementing various execution steps included in the inter prediction method in this application, to be specific, functional bodies that can implement the steps in the inter prediction method in this application and extensions and variations of these steps. For details, refer to descriptions of the inter prediction method in this specification. For brevity, details are not described in this specification.

Figure 11:
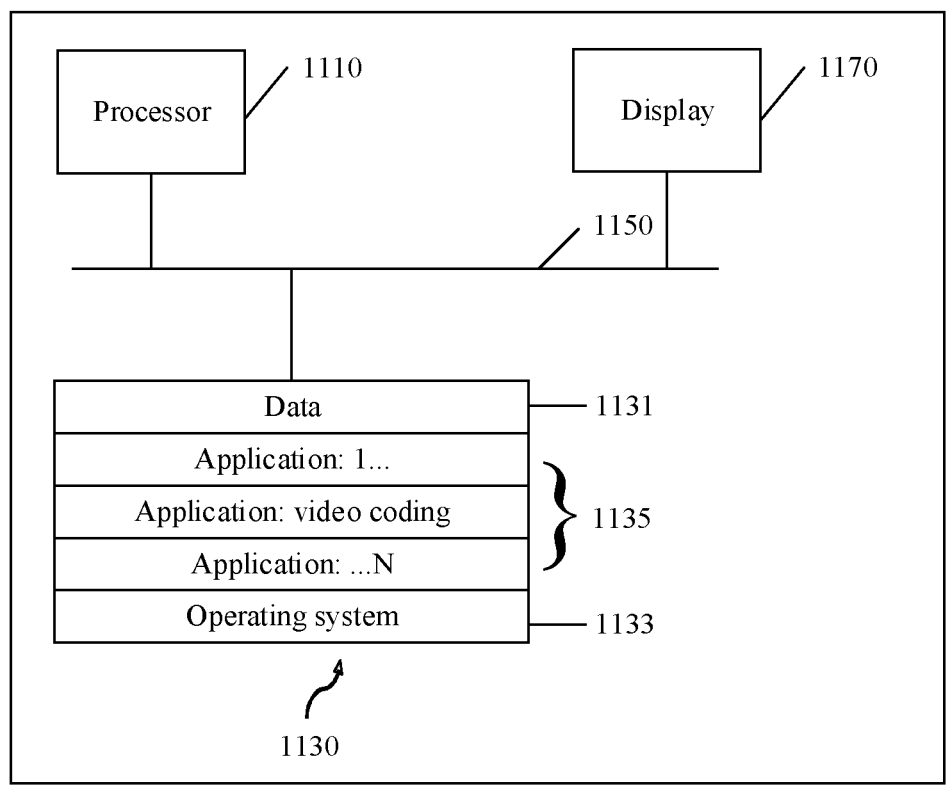
FIG. 11 is a schematic block diagram of an encoding device or a decoding device according to this application.

FIG. 11 is a schematic block diagram of an implementation of an encoding device or a decoding device (briefly referred to as a coding device 1100) according to an embodiment of this application. The coding device 1100 may include a processor 1110, a memory 1130, and a bus system 1150. The processor and the memory are connected to each other by using the bus system. The memory is configured to store an instruction. The processor is configured to execute the instruction stored in the memory. The memory of the coding device stores program code, and the processor may invoke the program code stored in the memory to perform various video encoding or decoding methods described in this application, especially the inter prediction method described in this application. To avoid repetition, details are not described herein again.

In this embodiment of this application, the processor 1110 may be a central processing unit (central processing unit, CPU), or the processor 1110 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 1130 may include a read-only memory (ROM) device or a random access memory (RAM) device. Any other proper type of storage device may alternatively be used as the memory 1130. The memory 1130 may include code and data 1131 that are accessed by the processor 1110 by using the bus system 1150. The memory 1130 may further include an operating system 1133 and an application program 1135. The application program 1135 includes at least one program that allows the processor 1110 to perform the video encoding or decoding method described in this application (especially, the inter prediction method described in this application). For example, the application program 1135 may include applications 1 to N, and further includes a video encoding or decoding application (briefly referred to as a video coding application) that performs the video encoding or decoding method described in this application.

The bus system 1150 may further include a power bus, a control bus, a status signal bus, and the like, in addition to a data bus. However, for clear description, various types of buses in the figure are marked as the bus system 1150.

Optionally, the decoding device 1100 may further include one or more output devices, for example, a display 1170. In an example, the display 1170 may be a touch display that combines a display and a touch unit that operably senses touch input. The display 1170 may be connected to the processor 1110 by using the bus system 1150.

A person skilled in the art can understand that, the functions described with reference to various illustrative logical blocks, modules, and algorithm steps disclosed and described in this specification can be implemented by hardware, software, firmware, or any combination thereof. If being implemented by software, the functions described with reference to the various illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, server, or another remote source through a coaxial cable, a fiber optic cable, a twisted pair, a digital subscriber line (DSL), or wireless technologies such as infrared, radio, and microwave, the coaxial cable, fiber optic cable, twisted pair, DSL, or wireless technologies such as infrared, radio, and microwave are included in a definition of medium. However, it should be understood that the computer-readable storage medium and the data storage medium do not include connections, carriers, signals, or other transitory media, but actually means non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of computer-readable media.

An instruction may be executed by one or more processors such as one or more digital signal processors (DSP), a general-purpose microprocessor, an application-specific integrated circuit (ASIC), a field programmable gate array (FPGA), or an equivalent integrated circuit or discrete logic circuit. Therefore, the term "processor" used in this specification may refer to the foregoing structure, or any other structure that may be applied to implementation of the technologies described in this specification. In addition, in some aspects, the functions described with reference to the various illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined, in combination with proper software and/or firmware, into a codec hardware unit, or be provided by interoperable hardware units (including one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
    determining a candidate motion information list of a current picture block to be coded using an affine merge mode, the candidate motion information list comprising at least one first candidate motion information group and at least one second candidate motion information group both comprising motion vectors for a first group of at least two control points of the current picture block, wherein a plurality of pieces of index information indicate the first candidate motion information group and the second candidate motion information group respectively, the first candidate motion information group is a motion information group determined based on motion information of control points of a first affine neighboring picture block of the current picture block and a motion model of the first affine neighboring picture block, and the second candidate motion information group is based on a set of motion information of at least two sample locations that are respectively neighboring to control points of a second group of at least two control points of the current picture block, and the at least two sample locations are located on at least one second neighboring picture block of the current picture block;
    determining target motion information from the candidate motion information list; and
    performing inter prediction on the current picture block based on the target motion information; and
    wherein the determining the candidate motion information list of the current picture block comprises:
    in response to that the second group of at least two control points is different from the first group of at least two control points, deriving the second candidate motion information group according to a location transformation formula and based on motion information corresponding to the second group of at least two control points of the current picture block.

2. The method according to claim 1, wherein determining the candidate motion information list of the current picture block comprises:
in response to that the first affine neighboring picture block is a picture block using an affine motion model, deriving, based on motion information of at least two control points of the first affine neighboring picture block and the affine motion model of the first affine neighboring picture block, motion information of at least two control points of the current picture block, and adding the motion information of the at least two control points of the current picture block into the candidate motion information list as the first candidate motion information group, wherein the at least two control points of the first affine neighboring picture block corresponds to the at least two control points of the current picture block.

3. The method according to claim 1, wherein an affine motion model of the current picture block and an affine motion model of the first affine neighboring picture block are four-parameter affine motion models; or
an affine motion model of the current picture block and an affine motion model of the first affine neighboring picture block are six-parameter affine motion models.

4. The method according to claim 1, wherein determining the candidate motion information list of the current picture block comprises:
adding the at least one first candidate motion information group to the candidate motion information list, and subsequently adding the at least one second candidate motion information group to the candidate motion information list, and
adding zero motion information to the candidate motion information list in response to that a length of the candidate motion information list is less than a predefined length N upon having added the at least one first candidate motion information group and the at least one second candidate motion information group.

5. The method according to claim 1, wherein the location transformation formula is based on a 4-parameter affine model or a 6-parameter model and coordinates of the first group of control points and the second group of control points.

6. The method according to claim 1, wherein:
the second group of at least two control points is a top-left control point, a top-right control point, and a bottom-right control point of the current picture block and the first group of at least two control points is the top-left control point, the top-right control point, and a bottom-left control point of the current picture block; or
the second group of at least two control points is a top-left control point, a bottom-left control point, and a bottom-right control point of the current picture block and the first group of at least two control points is the top-left control point, a top-right control point, and the bottom-left control point of the current picture block; or
the second group of at least two control points is a top-right control point, a bottom-left control point, and a bottom-right control point of the current picture block and the first group of at least two control points is a top-left control point, the top-right control point, and the bottom-left control point of the current picture block; or
the second group of at least two control points is a top-left control point and a bottom-left control point of the current picture block and the first group of at least two control points is the top-left control point and a top-right control point of the current picture block.

7. A device, comprising:
one or more processors; and
a non-transitory computer-readable storage medium coupled to the one or more processors and storing programming for execution by the one or more processors, wherein the programming, when executed by the one or more processors, causes the device to:
determine a candidate motion information list of a current picture block to be coded using an affine merge mode, wherein the candidate motion information list comprises at least one first candidate motion information group and at least one second candidate motion information group both comprising motion vectors for a first group of at least two control points of the current picture block, wherein a plurality of pieces of index information indicate the first candidate motion information group and the second candidate motion information group respectively, the first candidate motion information group is a motion information group determined based on motion information of control points of a first affine neighboring picture block of the current picture block and a motion model of the first affine neighboring picture block, and the second candidate motion information group is based on a set of motion information of at least two sample locations that are respectively neighboring to control points of a second group of at least two control points of the current picture block, and the at least two sample locations are located on at least one second neighboring picture block of the current picture block;
determine target motion information from the candidate motion information list; and
perform inter prediction on the current picture block based on the target motion information; and
wherein the determining the candidate motion information list of the current picture block comprises:
in response to that the second group of at least two control points is different from the first group of at least two control points, deriving the second candidate motion information group according to a location transformation formula and based on motion information corresponding to the second group of at least two control points.

8. The device according to claim 7, wherein the programming, when executed by the one or more processors, causes the device to determine the candidate motion information list of the current picture block by:
in response to that the first affine neighboring picture block is a picture block using an affine motion model, deriving, based on motion information of at least two control points of the first affine neighboring picture block and the affine motion model of the first affine neighboring picture block, motion information of at least two control points of the current picture block, and adding the motion information of the at least two control points of the current picture block into the candidate motion information list as the first candidate motion information group, wherein the at least two control points of the first affine neighboring picture block corresponds to the at least two control points of the current picture block.

9. The device according to claim 7, wherein an affine motion model of the current picture block and an affine motion model of the first affine neighboring picture block are four-parameter affine motion models; or an affine motion model of the current picture block and an affine motion model of the first affine neighboring picture block are six-parameter affine motion models.

10. The device according to claim 7, wherein the programming, when executed by the one or more processors, causes the device to determine the candidate motion information list of the current picture block by:

adding the at least one first candidate motion information group to the candidate motion information list, and subsequently adding the at least one second candidate motion information group to the candidate motion information list; and adding zero motion information to the candidate motion information list in response to that a length of the candidate motion information list is less than a predefined length N upon having added the at least one first candidate motion information group and the at least one second candidate motion information group.

11. The device according to claim 7, wherein the location transformation formula is based on a 4-parameter affine model or a 6-parameter model and coordinates of the first group of control points and the second group of control points.

12. The device according to claim 7, wherein:

the second group of at least two control points is a top-left control point, a top-right control point, and a bottom-right control point of the current picture block and the first group of at least two control points is the top-left control point, the top-right control point, and a bottom-left control point of the current picture block; or the second group of at least two control points is a top-left control point, a bottom-left control point, and a bottom-right control point of the current picture block and the first group of at least two control points is the top-left control point, a top-right control point, and the bottom-left control point of the current picture block; or the second group of at least two control points is a top-right control point, a bottom-left control point, and a bottom-right control point of the current picture block and the first group of at least two control points is a top-left control point, the top-right control point, and the bottom-left control point of the current picture block; or the second group of at least two control points is a top-left control point and a bottom-left control point of the current picture block and the first group of at least two control points is the top-left control point and a top-right control point of the current picture block.

13. A non-transitory computer-readable medium carrying a program code which, when executed by a computer device, causes the computer device to perform steps comprising:

determining a candidate motion information list of a current picture block to be coded using an affine merge mode, the candidate motion information list comprising at least one first candidate motion information group and at least one second candidate motion information group both comprising motion vectors for a first group of at least two control points of the current picture block, wherein a plurality of pieces of index information indicate the first candidate motion information group and the second candidate motion information group respectively, the first candidate motion information group is a motion information group determined based on motion information of control points of a first affine neighboring picture block of the current picture block and a motion model of the first affine neighboring picture block, and the second candidate motion information group is based on a set of motion information of at least two sample locations that are respectively neighboring to control points of a second group of at least two control points of the current picture block, and the at least two sample locations are located on at least one second neighboring picture block of the current picture block;

determining target motion information from the candidate motion information list; and performing inter prediction on the current picture block based on the target motion information; and wherein the determining the candidate motion information list of the current picture block comprises:

in response to that the second group of at least two control points is different from the first group of at least two control points, deriving the second candidate motion information group according to a location transformation formula and based on motion information corresponding to the second group of at least two control points.

14. The non-transitory computer-readable medium according to claim 13, wherein the determining the candidate motion information list of the current picture block comprises:

when the first affine neighboring picture block is a picture block using an affine motion model, deriving, based on motion information of at least two control points of the first affine neighboring picture block and the affine motion model of the first affine neighboring picture block, motion information of at least two control points of the current picture block, and adding the motion information of the at least two control points of the current picture block into the candidate motion information list as the first candidate motion information group, wherein the at least two control points of the first affine neighboring picture block corresponds to the at least two control points of the current picture block.

15. The non-transitory computer-readable medium according to claim 13, wherein an affine motion model of the current picture block and an affine motion model of the first affine neighboring picture block are four-parameter affine motion models; or an affine motion model of the current picture block and an affine motion model of the first affine neighboring picture block are six-parameter affine motion models.

16. The non-transitory computer-readable medium according to claim 13, wherein determining the candidate motion information list of the current picture block comprises:

adding the at least one first candidate motion information group to the candidate motion information list, and subsequently adding the at least one second candidate motion information group to the candidate motion information list, and adding zero motion information to the candidate motion information list in response to that a length of the candidate motion information list is less than a predefined length N upon having added the at least one first candidate motion information group and the at least one second candidate motion information group.

17. The non-transitory computer-readable medium according to claim 13, wherein the location transformation formula is based on a 4-parameter affine model or a 6-parameter model and coordinates of the first group of control points and the second group of control points.

18. The non-transitory computer-readable medium according to claim 13, wherein:
- the second group of at least two control points is a top-left control point, a top-right control point, and a bottom-right control point of the current picture block and the first group of at least two control points is the top-left control point, the top-right control point, and a bottom-left control point of the current picture block; or
- the second group of at least two control points is a top-left control point, a bottom-left control point, and a bottom-right control point of the current picture block and the first group of at least two control points is the top-left control point, a top-right control point, and the bottom-left control point of the current picture block; or
- the second group of at least two control points is a top-right control point, a bottom-left control point, and a bottom-right control point of the current picture block and the first group of at least two control points is a top-left control point, the top-right control point, and the bottom-left control point of the current picture block; or
- the second group of at least two control points is a top-left control point and a bottom-left control point of the current picture block and the first group of at least two control points is the top-left control point and a top-right control point of the current picture block.

* * * * *

UNITED STATES PATENT AND TRADEMARK OFFICE
CERTIFICATE OF CORRECTION

| | | |
|---|---|---|
| PATENT NO. | : 12,401,795 B2 | Page 1 of 1 |
| APPLICATION NO. | : 17/832871 | |
| DATED | : August 26, 2025 | |
| INVENTOR(S) | : Chen et al. | |

It is certified that error appears in the above-identified patent and that said Letters Patent is hereby corrected as shown below:

On the Title Page

In Column 2 (Other Publications), In Line 3, Delete "buJoint" and insert -- Joint --.

Signed and Sealed this
Thirteenth Day of January, 2026

John A. Squires
*Director of the United States Patent and Trademark Office*